(12) United States Patent
Ahn et al.

(10) Patent No.: US 11,216,094 B2
(45) Date of Patent: Jan. 4, 2022

(54) DISPLAY DEVICE AND INPUT-SENSING MEMBER

(71) Applicant: Samsung Display Co., Ltd., Yongin-si (KR)

(72) Inventors: Hyeong Cheol Ahn, Seoul (KR); Yang Han Son, Cheonan-si (KR); Yun Oh Nam, Hwaseong-si (KR); Won Il Lee, Cheonan-si (KR); Youn Hwan Jung, Hwaseong-si (KR); So Hyun Kim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 167 days.

(21) Appl. No.: 15/985,009

(22) Filed: May 21, 2018

(65) Prior Publication Data

US 2018/0364846 A1 Dec. 20, 2018

(30) Foreign Application Priority Data

Jun. 19, 2017 (KR) .................. 10-2017-0077581

(51) Int. Cl.
*G06F 3/041* (2006.01)
*G06F 1/16* (2006.01)
*G06F 1/20* (2006.01)

(52) U.S. Cl.
CPC .......... *G06F 3/0412* (2013.01); *G06F 1/1643* (2013.01); *G06F 1/1656* (2013.01); *G06F 1/203* (2013.01); *G06F 1/206* (2013.01)

(58) Field of Classification Search
CPC .... G06F 3/0412; G06F 1/1643; G06F 1/1656; G06F 1/203; G06F 1/206; G06F 1/1652;
(Continued)

(56) References Cited

U.S. PATENT DOCUMENTS 6,225,985 B1 5/2001 Armstrong et al.
8,228,309 B2 7/2012 Tamaki et al.
(Continued)

FOREIGN PATENT DOCUMENTS

CN 101788733 A 7/2010
CN 102117103 A 7/2011
(Continued)

OTHER PUBLICATIONS

EPO Extended Search Report dated Nov. 21, 2018, for corresponding European Patent Application No. 18177766.5 (10 pages).

*Primary Examiner* — Temesghen Ghebretinsae
*Assistant Examiner* — Ivelisse Martinez Quiles
(74) *Attorney, Agent, or Firm* — Lewis Roca Rothgerber Christie LLP

(57) ABSTRACT

A display device has a first area, and a second area that extends from the first area and has a bent shape, the display device including a display module including a display panel, which has a corner portion in the second area, an input-sensing member on the display panel and including a body portion, which overlaps with the display panel, and an extension, which extends from the body portion, is in the second area, and does not overlap with the display panel, and a first bonding layer between the display module and the input-sensing member, wherein an edge of the extension extends beyond an edge of the corner portion.

31 Claims, 32 Drawing Sheets

(58) Field of Classification Search
CPC .................. G06F 1/1618; G06F 3/041; G06F 2203/04102; G09F 9/33; G09F 9/35; H04M 1/0266; H04M 1/0268; H05K 5/06; B32B 7/12; B32B 2457/208
See application file for complete search history.

(56) References Cited

U.S. PATENT DOCUMENTS

| | | | |
|---|---|---|---|
| 8,400,767 B2 | 3/2013 | Yeom et al. | |
| 9,342,105 B2 | 5/2016 | Choi et al. | |
| 9,420,363 B2 | 8/2016 | Seo et al. | |
| 9,480,174 B2 | 10/2016 | Park | |
| 9,656,821 B2 | 5/2017 | Kato et al. | |
| 9,933,886 B2 | 4/2018 | Kim et al. | |
| 10,410,558 B2 | 9/2019 | Bae et al. | |
| 10,504,393 B2 | 12/2019 | Bae et al. | |
| 10,585,526 B2 | 3/2020 | Kim et al. | |
| 10,901,541 B2 | 1/2021 | Ko et al. | |
| 2007/0247452 A1 | 10/2007 | Suzuku et al. | |
| 2013/0002572 A1* | 1/2013 | Jin | G02F 1/133305 345/173 |
| 2014/0104762 A1* | 4/2014 | Park | H05K 5/0017 361/679.01 |
| 2014/0298643 A1 | 10/2014 | Li et al. | |
| 2016/0041679 A1 | 2/2016 | Ahn et al. | |
| 2016/0062525 A1 | 3/2016 | Kim | |
| 2016/0066412 A1 | 3/2016 | Choi et al. | |
| 2016/0066440 A1* | 3/2016 | Choi | G06F 1/1656 361/679.3 |
| 2016/0266672 A1 | 9/2016 | Inagaki et al. | |
| 2016/0299527 A1* | 10/2016 | Kwak | G06F 1/1656 |
| 2018/0329367 A1* | 11/2018 | Kuwabara | G06F 1/163 |
| 2021/0149514 A1 | 5/2021 | Ko et al. | |

FOREIGN PATENT DOCUMENTS

| | | |
|---|---|---|
| CN | 104461115 A | 3/2015 |
| CN | 104851363 A | 8/2015 |
| CN | 105659310 A | 6/2016 |
| CN | 105786237 A | 7/2016 |
| CN | 105892741 A | 8/2016 |
| CN | 106501949 A | 3/2017 |
| EP | 2730991 A1 | 5/2014 |
| KR | 10-2014-0046839 A | 4/2014 |
| KR | 10-1516766 A | 5/2015 |
| KR | 10-2016-0028583 A | 3/2016 |

* cited by examiner

DISPLAY DEVICE AND INPUT-SENSING MEMBER

CROSS-REFERENCE TO RELATED APPLICATION

This application claims priority to, and the benefit of, Korean Patent Application No. 10-2017-0077581, filed on Jun. 19, 2017, the disclosure of which is incorporated herein by reference in its entirety.

BACKGROUND

1. Field

The present disclosure relates to a display device and an input-sensing member.

2. Description of the Related Art

Display devices for displaying various information on a screen thereof are a core technology of the information and communications age, and are evolving into thinner, lighter, and more portable high-performance display devices. In accordance with recent developments in information technology, the demand for various types of display devices has increased, and various forms of research have been conducted on display devices, such as a liquid crystal display (LCD) device, an organic light-emitting diode (OLED) display device, and the like, and have also been conducted to determine how to enhance the design features of display devices and how to differentiate the functional features of display devices.

As one of the differentiated functional features of display devices, a waterproof function has attracted attention. Display devices having curved portions as their distinctive design feature have also attracted attention.

SUMMARY

Embodiments of the present disclosure provide a display device having improved reliability.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an embodiment of the present disclosure, a display device has a first area, and a second area that extends from the first area and has a bent shape, the display device including a display module including a display panel, which has a corner portion in the second area, an input-sensing member on the display panel and including a body portion, which overlaps with the display panel, and an extension, which extends from the body portion, is in the second area, and does not overlap with the display panel, and a first bonding layer between the display module and the input-sensing member, wherein an edge of the extension extends beyond an edge of the corner portion.

A bottom surface of the extension may be separated from the display panel.

The edge of the corner portion may be partially surrounded by the edge of the extension.

The edge of the corner portion may be rounded.

The display device may further include a window on the input-sensing member, wherein a distance between an edge of the window and the edge of the extension, measured in the second area along a direction, is smaller than a distance between the edge of the window and an edge of the body portion, measured in the second area along the direction.

The first bonding layer may have an edge that is in the second area, overlaps with the extension, does not overlap the display panel, and is between the edge of the extension and the edge of the corner portion.

In the second area, an edge of the first bonding layer may be aligned with the edge of the corner portion.

The first bonding layer may include an optical clear adhesive (OCA), a pressure sensitive adhesive (PSA), or an optical clear resin (OCR) layer.

The display panel may include a base substrate, a light-emitting element on the base substrate, and an encapsulation layer on the light-emitting element, and the first bonding layer may be on the encapsulation layer.

The display device may further include a window on the input-sensing member, wherein the input-sensing member includes an input-sensing layer on the first bonding layer, and a polarizing layer between the input-sensing layer and the window, and wherein the input-sensing layer includes a base portion on the first bonding layer, and sensing electrodes on a surface of the base portion.

The sensing electrodes may include a plurality of first sensing electrodes, which include a plurality of first sensing portions and a plurality of first connecting portions electrically connected to the first sensing portions, and a plurality of second sensing electrodes, which include a plurality of second sensing portions and a plurality of second connecting portions electrically connected to the second sensing portions, wherein the first sensing portions and the second sensing portions are on the same layer, and wherein the first connecting portions and the second connecting portions are on different layers.

The base portion may include a phase retarder.

The input-sensing layer may further include a polymer organic layer between the base portion and the sensing electrodes.

The display device may further include a window on the input-sensing member, wherein the input-sensing member includes a polarizing layer on the first bonding layer, and an input-sensing layer on the polarizing layer, wherein the window is on the input-sensing layer, and wherein the input-sensing layer includes a base portion on the first bonding layer, and sensing electrodes on a surface of the base portion.

The display device may further include a window on the input-sensing member, wherein the input-sensing member includes a polarizing layer on the first bonding layer, and an input-sensing layer on the polarizing layer, wherein the window is on the input-sensing layer, and wherein the input-sensing layer includes a base portion below a second bonding layer, and sensing electrodes on a surface of the base portion.

The display device may further include a window on the input-sensing member, and a second bonding layer between the window and the input-sensing member for coupling the window to the input-sensing member, wherein the second bonding layer includes an OCA, PSA, or OCR layer.

The display device may further include a window on the input-sensing member, a first waterproof member coupled to a bottom surface of the display module, and located in the second area along an edge of the display module, a second waterproof member coupled to a bottom surface of the window, and spaced apart from the first waterproof member, and a waterproof filling member filling a gap between the first and second waterproof members in an area near the corner portion.

The waterproof filling member may contact the window, the extension, the first waterproof member, and the second waterproof member.

The display device may further include a bracket below the display module, coupled to the first and second waterproof members, and contacting the waterproof filling member.

The display module may further include a panel lower member below the display panel, and the first waterproof member may be coupled to a bottom surface of the panel lower member.

The panel lower member may include a buffer member below the display panel, and a heat dissipating member below the buffer member.

The buffer member may include a light-blocking layer, and the panel lower member may further include a digitizer between the buffer member and the heat dissipating member.

According to another embodiment, a display device includes a display module including a display panel having a corner portion, an input-sensing member on the display panel and including a body portion, which overlaps with the display panel, and an extension, which extends from the body portion in an area near the corner portion and does not overlap the display panel, a first bonding layer between the input-sensing member and the display panel for coupling the input-sensing member and the display panel, a window on the input-sensing member and having a first area, which overlaps with the display panel, and a second area, which is an area other than the first area, a second bonding layer between the window and the input-sensing member for coupling the window and the input-sensing member, a first waterproof member coupled to a bottom surface of the display module, and located along an edge of the display module, a second waterproof member coupled to a bottom surface of the window, located in the second area, and spaced apart from the first waterproof member, and a waterproof filling member sealing a space between the first and second waterproof members in the area near the corner portion, wherein in the area near the corner portion, an edge of the extension extends beyond an edge of the first bonding layer or an edge of the second bonding layer.

In the area near the corner portion, the edge of the extension may extend beyond the edge of the first bonding layer, and the edge of the second bonding layer extends beyond the edge of the extension.

In the area near the corner portion, the edge of the extension may extend beyond the edge of the first bonding layer and is aligned with the edge of the second bonding layer.

In the area near the corner portion, the edge of the extension may extend beyond the edge of the second bonding layer, and the edge of the first bonding layer may extend beyond the edge of the extension.

In the area near the corner portion, the edge of the extension may extend beyond the edge of the second bonding layer, and is aligned with the edge of the first bonding layer.

In the area near the corner portion, the edge of the extension may extend beyond the edge of the first bonding layer and the edge of the second bonding layer.

The waterproof filling member may contact with the window, the extension, the first waterproof member, and the second waterproof member.

The display device may further include a bracket below the display module, coupled to the first and second waterproof members, and contacting the waterproof filling member.

The display module may further include a panel lower member below the display panel, and the first waterproof member may be coupled to a bottom surface of the panel lower member.

According to another embodiment, an input-sensing member includes a body portion having a rectangular planar shape, and an extension extending outwardly from a corner of the body portion.

The body portion may include a first edge extending in a first direction, and a second edge extending in a second direction that crosses the first direction, and an edge of the extension may be connected to the first and second edges, and is positioned outside the second edge in the first direction.

The edge of the extension may extend beyond the first edge in the second direction.

The body portion may include a base portion and sensing electrodes on a surface of the base portion, wherein the sensing electrodes include a plurality of first sensing electrodes, which include a plurality of first sensing portions and a plurality of first connecting portions electrically connected to the first sensing portions, and a plurality of second sensing electrodes, which include a plurality of second sensing portions and a plurality of second connecting portions electrically connected to the second sensing portions, wherein the first sensing portions and the second sensing portions are on the same layer, and wherein the first connecting portions and the second connecting portions are on different layers.

According to the aforementioned and other embodiments of the present disclosure, a display device having improved reliability and an input-sensing member for the display device can be provided.

Other features and embodiments may be apparent from the following detailed description, the drawings, and the claims.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Figure 1:
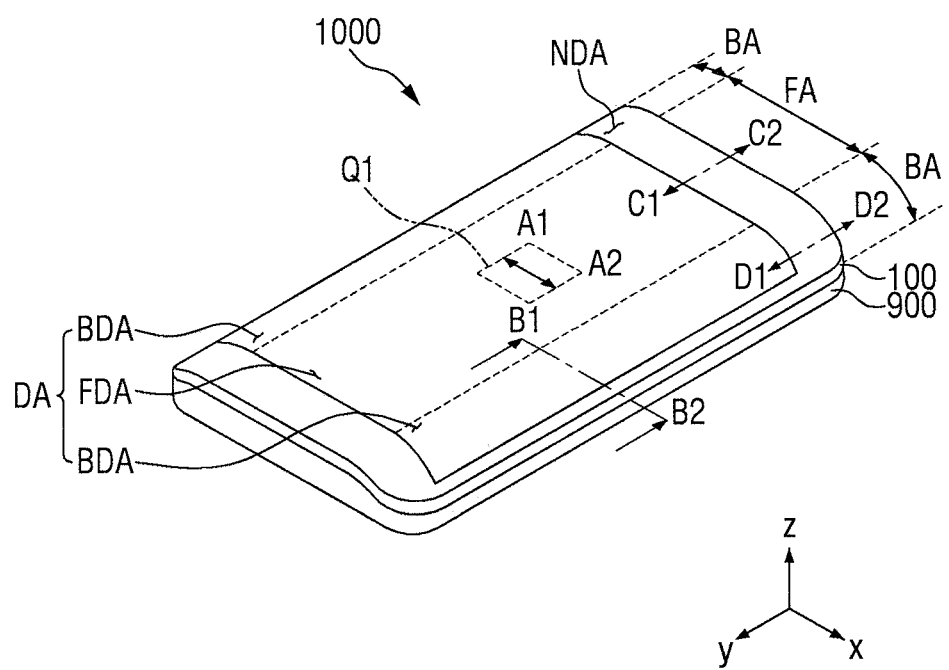
FIG. 1 is a perspective view of a display device according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device according to an embodiment of the present disclosure.

FIG. 1 shows a mobile terminal as an example of a display device 1000 according to an embodiment of the present disclosure. Examples of the mobile terminal include a tablet PC, a smartphone, a personal digital assistant (PDA), a portable multimedia player (PMP), a gaming console, a wrist watch-type electronic device, and the like, but the type of the display device 1000 is not particularly limited. That is, alternatively, the display device 1000 may be used in a large-size electronic apparatus, such as a TV or an external billboard, or may be used in a small-size electronic device, such as a PC, a notebook computer, a navigation device for a vehicle, or a camera.

Referring to FIG. 1, the display device 1000 includes a plurality of areas defined on a display surface thereof. The display device 1000 may include a display area DA in which an image is displayed, and a non-display area NDA that adjoins the display area DA. The non-display area NDA may surround the display area DA.

The display device 1000 may be partially curved. The display device 1000 may include a first area FA, and one or more second areas BA that extend from the first area FA. In some embodiments, the first area FA may be a flat area having a flat shape, and the second areas BA may be bent areas having a bent shape. The first area FA will hereinafter be referred to as the flat area FA, and the second areas BA will hereinafter be referred to as the bent areas BA. The flat area FA is parallel to a plane defined by first and second directions x and y, and the normal direction of the flat area FA is parallel to a third direction z. The third direction z is a reference direction by which the top and bottom surfaces of elements that will be described later are differentiated. The second direction y may be a direction intersecting the first direction x, and the third direction z may be a direction intersecting the plane defined by the first and second directions x and y. For example, the second direction y may substantially perpendicularly intersect the first direction x, while the third direction z may substantially perpendicularly intersect the plane defined by the first and second directions x and y.

The bent areas BA may be on respective sides (i.e., left and right sides) of the flat area FA.

The bent areas BA may have curved surfaces that are bent from the flat surface FA along the first direction x and that then extend in parallel to the second direction y. FIG. 1 illustrates the bent areas BA as being on both sides of the flat area FA, but the present disclosure is not limited thereto. Alternatively, the display device 1000 includes only one bent area BA on only one side of the flat area FA.

Part of the display area DA is defined by the flat area FA, and part of the display area DA is defined by the bent areas BA.

The part of the display area DA defined by the flat area FA will hereinafter be referred to as a flat display area FDA, and the part of the display area DA defined by the bent areas BA will hereinafter be referred to as bent display areas BDA.

Figure 2:
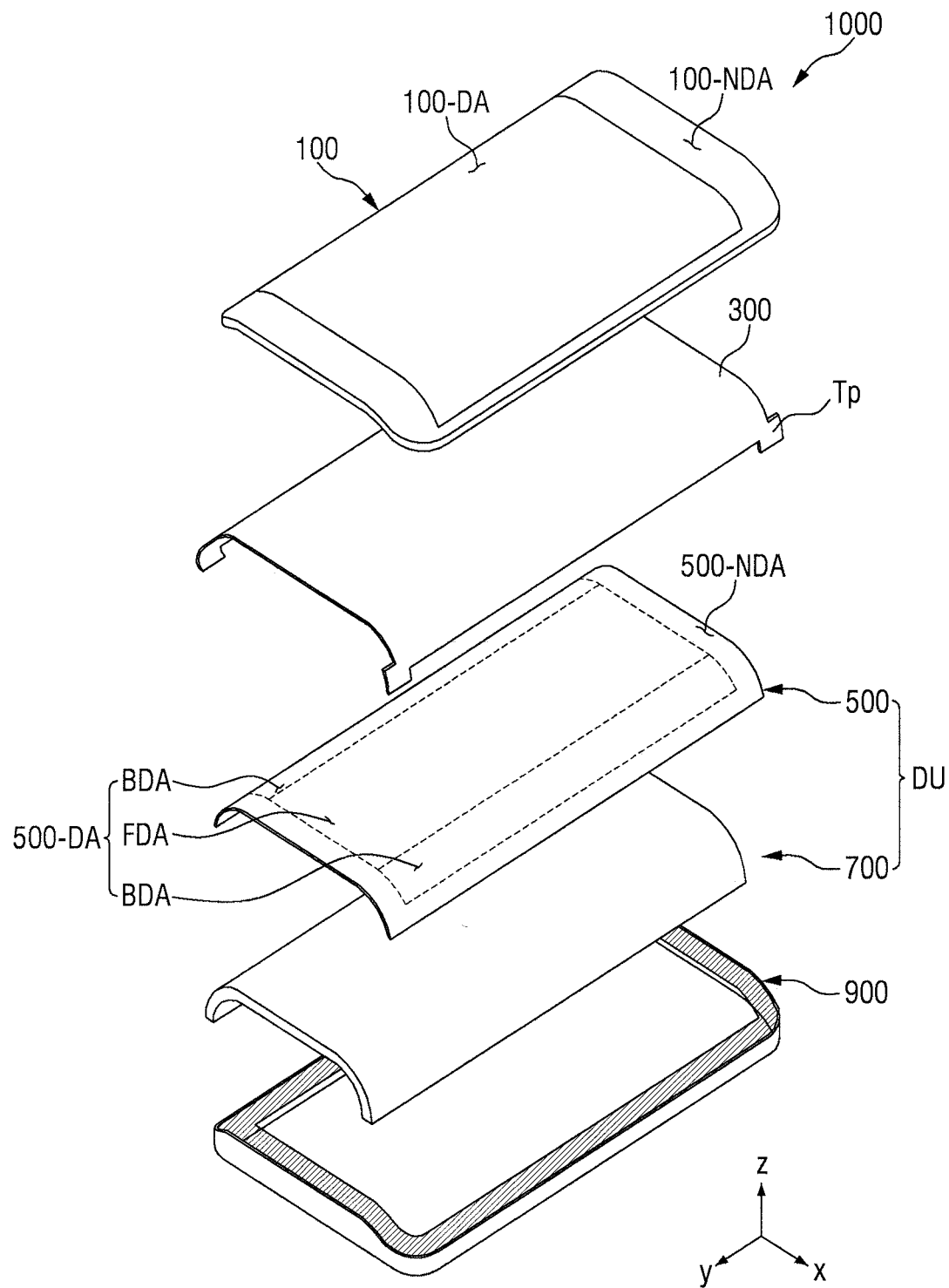
FIG. 2 is an exploded perspective view of the display device of FIG. 1.
Figure 3:
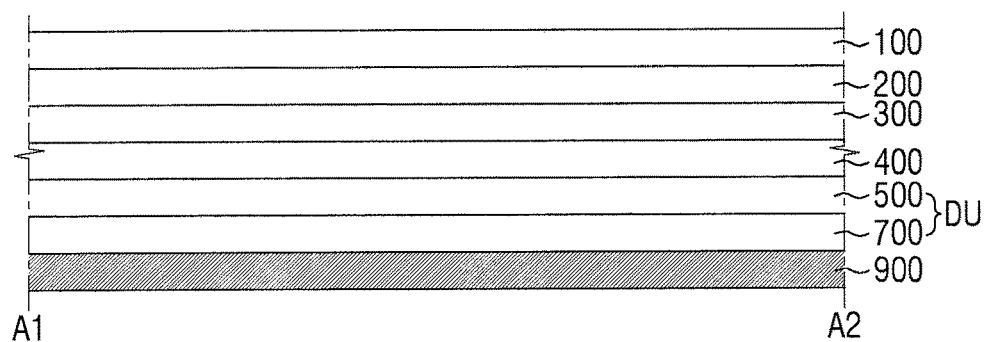
FIG. 3 is a cross-sectional view taken along the line A1-A2 of FIG. 1.

FIG. 2 is an exploded perspective view of the display device of FIG. 1, and FIG. 3 is a cross-sectional view taken along the line A1-A2 of FIG. 1.

Referring to FIGS. 1 through 3, the display device 1000 includes a window 100, an input-sensing member 300, a display module DU, which includes a display panel 500 and a panel lower member 700, and a bracket 900.

Each of the window 100, the input-sensing member 300, the display panel 500, and the panel lower member 700 may have a flat portion, which is in the flat area FA, and bent portions, which are in the bent areas BA.

The window 100 includes a light-transmitting portion 100-DA, which transmits an image provided by the display panel 500 therethrough, and a light-blocking portion 100-NDA, which adjoins the light-transmitting portion 100-DA.

The window 100 is on the display panel 500. The window 100 may be formed of a material such as glass, sapphire, plastic, or the like.

The input-sensing member 300 may be between the window 100 and the display module DU. The input-sensing member 300 may include an input-sensing layer and a polarizing layer. The input sensing member 300 may operate in a resistive, capacitive, or electromagnetic-induction manner, and may acquire coordinate information of a point where a touch event occurs. The polarizing layer can reduce the reflectance of external light incident thereupon from above the window 100.

The input-sensing member 300 includes extensions Tp, which extend outwardly from the corners of the input-sensing member 300.

The display module DU is below the input-sensing member 300. The display module DU may include the display panel 500, which is below the input-sensing member 300, and the panel lower member 700, which is below the display panel 500.

The display panel 500 may include a display area 500-DA and a non-display area 500-NDA. The display area 500-NDA, which is an area in which an image is displayed, overlaps with the light-transmitting portion 100-DA of the window 100. The non-display area 500-NDA, which is an area in which an image is not displayed, adjoins the display area 500-DA and overlaps with the light-blocking portion 100-NDA of the window 100. The display area 500-DA of the display panel 500 may include a flat display area FDA and bent display areas BDA.

In some embodiments, the display panel 500 may be a display panel including self-emitting elements. For example, the display panel 500 may include organic light-emitting diodes (OLEDs) having an organic light-emitting layer as their light-emitting layer, or may include quantum dot light-emitting diodes (QLEDs) having a quantum dot light-emitting layer as their light-emitting layer, but the present disclosure is not limited thereto. That is, alternatively, the display panel 500 may be a liquid crystal display (LCD) panel, for example. The display panel 500 will hereinafter be described as including OLEDs.

The panel lower member 700 may be below the display panel 500 and may be attached to the bottom surface of the display panel 500. The panel lower member 700 may include at least one of a buffer member and a heat dissipating member.

The bracket 900 may be below the panel lower member 700. The bracket 900 may fix and protect the display module DU, the input-sensing member 300, and various other elements and circuits of the display device 1000. In some embodiments, the bracket 900 may be formed of a synthetic resin material, a metal material, or a combination of different materials.

In some embodiments, part of the bracket 900 may be exposed on the sides of the display device 1000 to form the lateral exterior of the display device 1000. In some embodiments, an outer housing may be coupled to a lower portion of the bracket 900, but the present disclosure is not limited thereto. For example, alternatively, the bracket 900 itself may serve as the outer housing of the display device 1000 with no additional element coupled to the lower portion of the bracket 900.

A first bonding layer 400 (FIG. 3) may be between the display module DU and the input-sensing member 300. The first bonding layer 400 couples the input-sensing member 300 and the display module DU (e.g., couples the input-sensing member 300 and the display panel 500). In some embodiments, the first bonding layer 400 may be a transparent adhesive layer. For example, the first bonding layer 400 may be an optical clear adhesive (OCA), pressure sensitive adhesive (PSA), or optical clear resin (OCR) layer.

A second bonding layer 200 may be between the window 100 and the input-sensing member 300, and the window 100 and the input-sensing member 300 may be coupled together via the second bonding layer 200. In some embodiments, the second bonding layer 200, like the first bonding layer 400, may be a transparent adhesive layer. For example, the second bonding layer 200 may be an OCA, PSA, or OCR layer.

Figure 4:
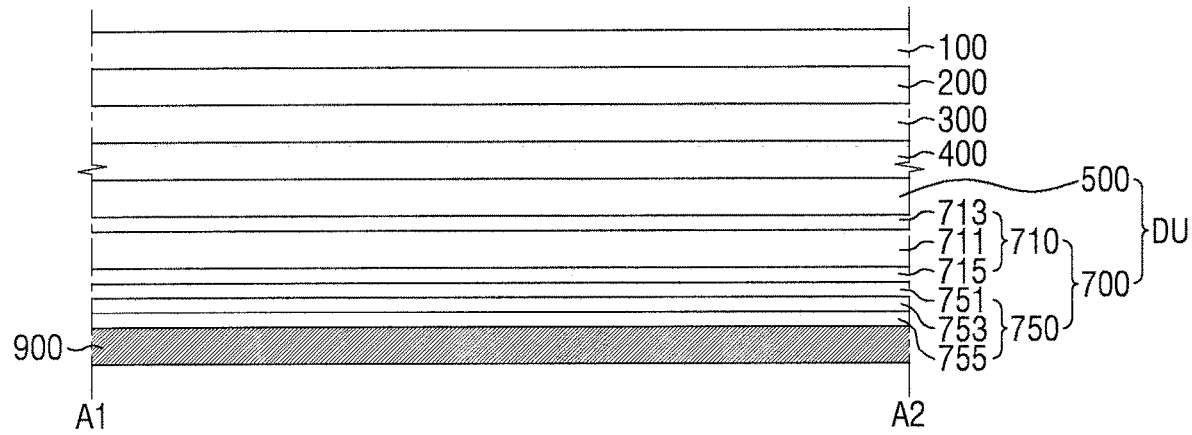
FIG. 4 is a cross-sectional view illustrating a panel lower member of FIG. 3.

A structure in which the input-sensing member 300 and the display module DU are stacked will hereinafter be described with reference to FIGS. 4 through 10. FIG. 4 is a cross-sectional view illustrating the panel lower member of FIG. 3.

Referring to FIG. 4, the display module DU may include the display panel 500 and the panel lower member 700, which is below the display panel 500. The panel lower member 700 may include a buffer member 710, which is below the display panel 500, and a heat dissipating member 750, which is below the buffer member 710.

The buffer member 710 can disperse an impact applied to the display panel 500 and the window 100. The buffer member 710 can absorb some of the impact applied to the display panel 500 and the window 100, and can thus prevent the display panel 500 and the window 100 from being damaged. The buffer member 710 may include a buffer layer 711, a first adhesive layer 713, which is on the buffer layer 711, and a second adhesive layer 715, which is below the buffer layer 711. The buffer layer 711 may be formed of a polymer resin such as polyurethane (PU), polycarbonate (PC), polypropylene (PP), or polyethylene (PE), or the like or may be formed of rubber, a urethane-based material, or a sponge obtained by foaming an acrylic material.

The buffer layer 711 may be coupled to the display panel 500 via the first adhesive layer 713 and may be coupled to the heat dissipating member 750 via the second adhesive layer 715. In some embodiments, the first and second adhesive layers 713 and 715 may be formed of a PSA or the like.

The heat dissipating member 750 may include a graphite layer 751, which is below the buffer member 710, a conductive layer 755, which is below the graphite layer 751, and an adhesive layer 753, which is between the conductive layer 755 and the graphite layer 751.

The graphite layer 751 includes graphite molecules. Graphite has a plate-like structure in which carbon atoms are bonded to one another along a horizontal direction. Accordingly, the graphite layer 751 has a higher thermal conductivity in the horizontal direction than in a vertical direction, and has an excellent heat dissipation property.

The conductive layer 755 has a heat dissipation function and an electromagnetic wave shielding function. The conductive layer 755 may comprise various materials capable of shielding electromagnetic waves and having excellent thermal conductivity. For example, the conductive layer 755 may comprise a material such as copper (Cu), nickel (Ni), or ferrite.

Figure 5:
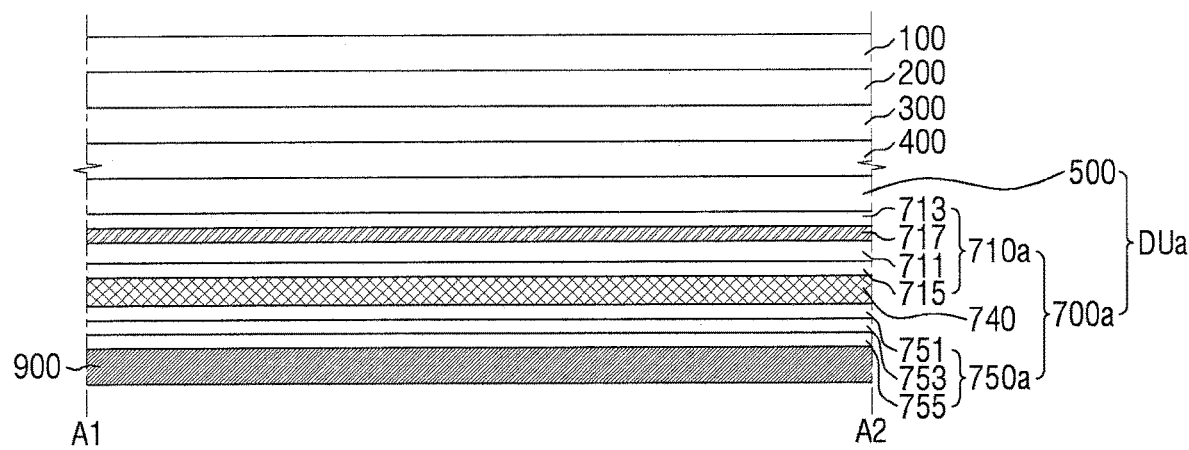
FIG. 5 is a cross-sectional view illustrating a modified example of the panel lower member of FIG. 4.

FIG. 5 is a cross-sectional view illustrating a modified example of the display module of FIG. 4. FIG. 5 is a cross-sectional view illustrating a modified example of the panel lower member of FIG. 4.

Referring to FIG. 5, a display module DUa includes a display panel 500 and a panel lower member 700a, which is below the display panel 500. The panel lower member 700a includes a buffer member 710a, which is below the display panel 500, a heat dissipating member 750a, which is below the buffer member 710a, and a digitizer 740, which is between the buffer member 710a and the heat dissipating member 750a.

The buffer member 710a, unlike the buffer member 710 of FIG. 4, may further include a light-blocking layer 717. The light-blocking layer 717 may prevent conductive wirings (i.e., first and second conductive wirings) of the digitizer 740 from becoming visible from the outside.

In some embodiments, the light-blocking layer 717 may be on at least one surface of the buffer layer 711. The light-blocking layer 717 is illustrated as being between the buffer layer 711 and the first adhesive layer 713, but the present disclosure is not limited thereto. For example, alternatively, the light-blocking layer 717 may be between the buffer layer 711 and the second adhesive layer 715. As another example, the light-blocking layer 717 may be on both surfaces of the buffer layer 711 (e.g., between the buffer layer 711 and the first adhesive layer 713, and between the buffer layer 711 and the second adhesive layer 715).

The digitizer 740, which is attached to the second adhesive layer 715, may be below the buffer member 710a.

In response to an input made to the display device 1000 via, for example, a stylus pen, the digitizer 740 may sense the coordinates and/or pen pressure of the input. The digitizer 740 may include the first and second conductive wirings that cross each other to form coordinates.

The heat dissipating member 750 may be below the digitizer 740, and the digitizer 740 and the heat dissipating member 750 may be coupled together via an adhesive layer. The graphite layer 751, the adhesive layer 753, and the conductive layer 755 of the heat dissipating member 750 are as described above.

Figure 6:
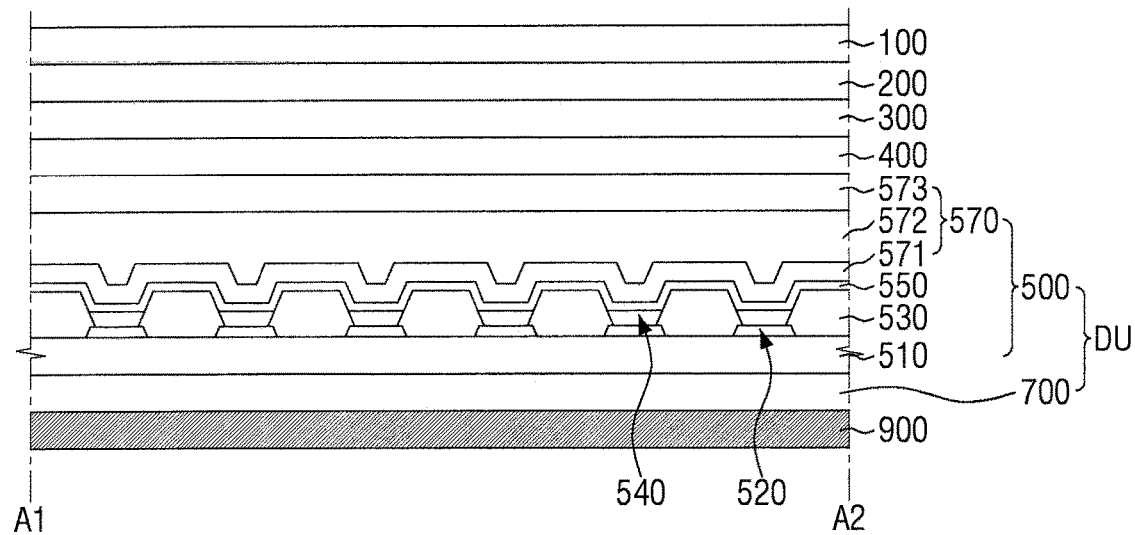
FIG. 6 is a cross-sectional view illustrating a display panel of FIG. 3.

FIG. 6 is a cross-sectional view illustrating the display panel of FIG. 3. Referring to FIG. 6, the display panel 500 includes a base substrate 510, first electrodes 520, a pixel-defining film 530, a light-emitting layer(s) 540, a second electrode 550, and an encapsulation layer 570.

The base substrate 510 may be on the panel lower member 700. The base substrate 510 may be an insulating substrate. For example, the base substrate 510 may comprise a material such as glass, quartz, a polymer resin, or the like. The polymer resin may be polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), PC, cellulose triacetate (CAT), cellulose acetate propionate (CAP), or a combination thereof. In some embodiments, the base substrate 510 may be a flexible substrate.

The first electrodes 520 may be on the base substrate 510. In some embodiments, the first electrodes 520 may be anode electrodes.

A plurality of elements may be further between the base substrate 510 and the first electrodes 520. For example, the plurality of elements include a buffer layer, a plurality of conductive wirings, an insulating layer, and a plurality of thin-film transistors (TFTs).

The pixel-defining film 530 may be on the first electrodes 520. The pixel-defining film 530 may include openings, which at least partially expose the first electrodes 520.

The light-emitting layer 540 may be on the first electrodes 520. In some embodiments, the light-emitting layer 540 may emit one of red light, green light, and/or blue light. The red light may have a wavelength of about 620 nm to 750 nm, the green light may have a wavelength of about 495 nm to 570 nm, and the blue light may have a wavelength of about 450 nm to 495 nm.

Alternatively, in other embodiments, the light-emitting layer 540 may emit white light. In a case where the light-emitting layer 540 emits white light, the light-emitting layer 540 may include a stack of a red light-emitting layer, a green light-emitting layer, and/or a blue light-emitting layer. The light-emitting layer 540 may further include color filters for displaying red light, green light, and/or blue light.

In some embodiments, the light-emitting layer 540 may be an OLED layer. Alternatively, in other embodiments, the light-emitting layer 540 may be a OLED layer.

The second electrode 550 may be on the light-emitting layer 540 and on the pixel-defining film 530. The second electrode 550 may be formed on an entirety of the surfaces (e.g., upper surfaces) of the light-emitting layer 540 and the pixel-defining film 530. In some embodiments, the second electrode 550 may be a cathode electrode.

The first electrodes 520, the second electrode 550, and the light-emitting layer 540 may form respective light-emitting elements.

The encapsulation layer 570 may be on the light-emitting elements including the first electrodes 520, the second electrode 550, and the light-emitting layer 540. The encapsulation layer 570 may encapsulate the light-emitting elements, and may reduce or prevent moisture from infiltrating into the light-emitting elements.

In some embodiments, the encapsulation layer 570 may be formed by thin film encapsulation (TFE) and may include at least one organic film and at least one inorganic film. For example, the encapsulation layer 570 may include a first inorganic film 571, which is on the second electrode 550, an organic film 572, which is on the first inorganic film 571, and a second inorganic film 573, which is on the organic film 572.

The first inorganic film 571 may reduce or prevent moisture or oxygen from infiltrating into the light-emitting elements including the first electrodes 520, the second electrode 550, and the light-emitting layer 540. The first inorganic film 571 may be formed of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, or the like.

The organic film 572 may be on the first inorganic film 571. The organic film 572 may improve the flatness of the encapsulation layer 570. The organic film 572 may be formed of a liquid organic material. For example, the organic film 572 may be formed of an acrylic resin, a methacrylic resin, polyisoprene, a vinyl resin, an epoxy resin, a urethane resin, a cellulose resin, a perylene resin, or the like. The organic material used to form the organic film 572 may be provided through deposition, printing, and coating and may be subjected to curing.

The second inorganic film 573 may be on the organic film 572. The second inorganic film 573 may perform substantially the same function as, or a similar function to, the first inorganic film 571 and may be formed of substantially the same material as, or of a similar material to, the first inorganic film 571. The second inorganic film 573 may completely cover the organic film 572.

However, the structure of the encapsulation layer 570 is not particularly limited, and the stack structure of the encapsulation layer 570 may vary. Alternatively, in other embodiments, the encapsulation layer 570 may be formed as a glass substrate or the like.

The first bonding layer 400 may be on the encapsulation layer 570, and the display panel 500 and the input-sensing member 300 may be coupled together via the first bonding layer 400.

Figure 7:
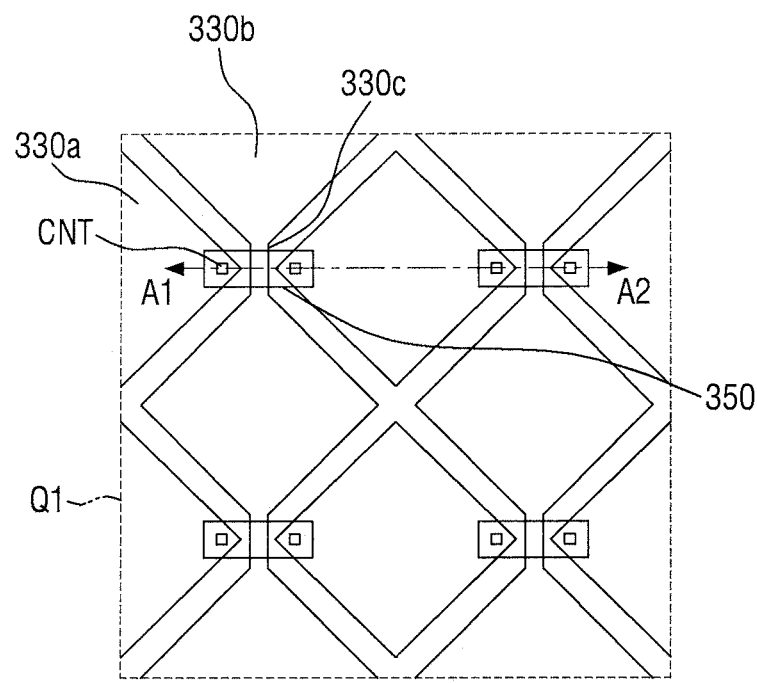
FIG. 7 is a plan view illustrating part of an input-sensing layer in an area Q1 of FIG. 1.
Figure 8:
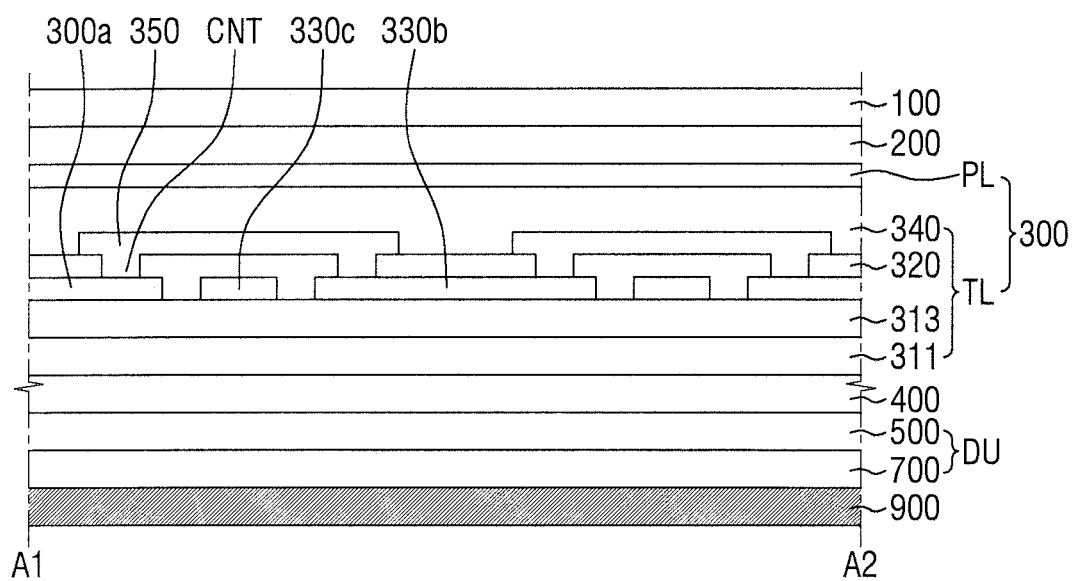
FIG. 8 is a cross-sectional view taken along the line A1-A2 of FIG. 1 or FIG. 7.

FIG. 7 is a plan view illustrating part of the input-sensing layer in an area Q1 of FIG. 1, and FIG. 8 is a cross-sectional view taken along the line A1-A2 of FIG. 1 or FIG. 7.

Referring to FIGS. 1, 7, and 8, the input-sensing member 300 may include an input-sensing layer TL and a polarizing layer PL.

The input-sensing layer TL may include a base portion 311, which is on the first bonding layer 400, sensing electrodes (330a, 330b, 330c, and 350), which are on the base portion 311, and first and second insulating layers 320 and 340, and may further include a polymer organic layer 313, which is between the base portion 311 and the sensing electrodes (330a, 330b, 330c, and 350).

The base portion 311 provides a base surface for the sensing electrodes (330a, 330b, 330c, and 350). For example, the base portion 311 may include a film-type phase retarder.

The polymer organic layer 313 may be a separation layer that separates a carrier substrate from the sensing electrodes (330a, 330b, 330c, and 350) and the first and second insulating layers 320 and 340, which are formed on the carrier substrate, during the formation of the input-sensing layer TL. For example, the polymer organic layer 313 may comprise at least one material selected from the group consisting of PI, polyvinyl alcohol (PVA), polyamic acid, polyimide, PE, polystyrene (PS), polynorbornene, a phenyl-maleimide copolymer, polyazobenzene, polyphenylene phthalamide, polyester, polymethyl methacrylate (PMMA), PAR, a cinnamate-based polymer, a coumarin-based polymer, a phthalimidine-based polymer, a chalcone-based polymer, and an aromatic acetylene-based polymer.

The sensing electrodes (330a, 330b, 330c, and 350) may be on the polymer organic layer 313. The sensing electrodes (330a, 330b, 330c, and 350) may include a plurality of first sensing portions 330a, which are arranged along the first direction x, a plurality of second sensing portions 330b, which are arranged along the second direction y and are spaced apart from the first sensing portions 330a, second connecting portions 330c, which connect the second sensing portions 330b to one another, and first connecting portions 350, which connect the first sensing portions 330a to one another. The first sensing portions 330a and the first connecting portions 350 form collectively first sensing electrodes (330a and 350), and the second sensing portions 330b and the second connecting portions 330c may collectively form second sensing electrodes (330b and 330c).

In some embodiments, the first sensing portions 330a, the second sensing portions 330b, and the second connecting portions 330c may be on the same layer and may be formed of the same conductive material. For example, the conductive material may be a metal material. Examples of the metal material may be molybdenum (Mo), silver (Ag), titanium (Ti), Cu, aluminum (Al), and an alloy thereof. Alternatively, the conductive material may include a transparent conductive oxide such as indium tin oxide (ITO), indium zinc oxide (IZO), zinc oxide (ZnO), indium tin zinc oxide (ITZO), or the like. Alternatively, the conductive material may include a conductive polymer such as PEDOT, metal nanowires, graphene, or the like. In a case where the conductive material includes metal nanowires, the first sensing portions 330a, the second sensing portions 330b, and the second connecting portions 330c may be in a metal mesh shape.

The first insulating layer 320 may be on the first sensing portions 330a, the second sensing portions 330b, and the second connecting portions 330c. The first insulating layer 320 may insulate the second connecting portions 330c from the first connecting portions 350. In some embodiments, the first insulating layer 320 may be formed on the entire surface of a base portion 310. Alternatively, in other embodiments, the first insulating layer 320 may be formed only at the crossing regions between the first connecting portions 350 and the second connecting portions 330c.

Contact holes CNT, which partially expose the first sensing portions 330a, may be formed in the first insulating layer 320.

The first connecting portions 350 may be on the first insulating layer 320 and may electrically connect respective ones of the first sensing portions 330a, which are adjacent to one another in the first direction x, via the contact holes CNT. The first connecting portions 350, like the first sensing portions 330a, the second sensing portions 330b, and the second connecting portions 330c, may be formed of a conductive material such as, for example, a metal material, a transparent conductive oxide, a conductive polymer, metal nanowires, graphene, or the like.

The second insulating layer 340 may be on the first connecting portions 350 and the first insulating layer 320.

Each of the first and second insulating layers 320 and 340 may have a single-layer or multilayer structure. Each of the first and second insulating layers 320 and 340 may comprise an inorganic material, an organic material, or a combination thereof. For example, at least one of the first and second insulating layers 320 and 340 may include an inorganic film. The inorganic film may comprise at least one of aluminum oxide, titanium oxide, silicon oxide, silicon oxynitride, zirconium oxide, and hafnium oxide.

In another example, at least one of the first and second insulating layers 320 and 340 may include an organic film. The organic film may comprise at least one of an acrylic resin, a methacrylic resin, a polyisoprene, a vinyl resin, an epoxy resin, a urethane resin, a cellulose resin, a siloxane resin, a PI resin, a polyamide resin, and a perylene resin.

The polarizing layer PL may be on the input-sensing layer TL. The polarizing layer PL may be between the input-sensing layer TL and the window 100 (e.g., between the input-sensing layer TL and the second bonding layer 200). As described above, the polarizing layer PL can reduce or prevent the reflection of external light.

Figure 9:
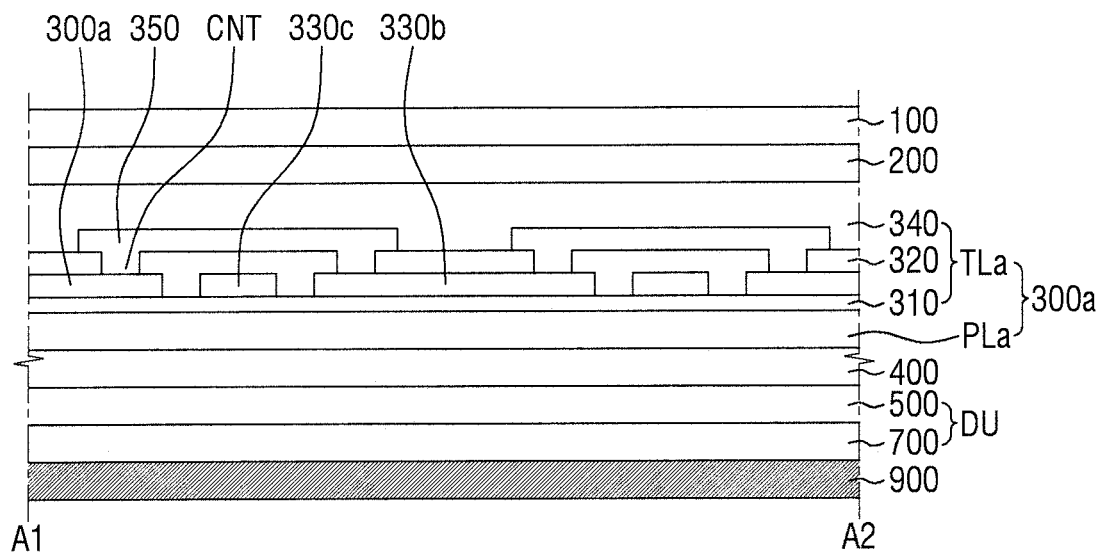
FIG. 9 is a cross-sectional view illustrating a modified example of an input-sensing member of FIG. 8.

FIG. 9 is a cross-sectional view illustrating a modified example of the input-sensing member of FIG. 8.

Referring to FIG. 9, an input-sensing member 300a may include an input-sensing layer TLa and a polarizing layer PLa.

The input-sensing layer TLa may include a base portion 310, sensing electrodes (330a, 330b, 330c, and 350), which are on the base portion 310, and first and second insulating layers 320 and 340.

In some embodiments, the base portion 310 may be an insulating substrate. The insulating substrate is substantially the same as, or at least similar to, the base substrate 510 of the display panel 500 of FIG. 5, and thus, a detailed description thereof will be omitted.

The first and second insulating layers 320 and 340 may be on a surface of the base portion 310 that faces the window 100, for example, the top surface of the base portion 310, and the second bonding layer 200 may be on the second insulating layer 340.

The polarizing layer PLa may be on the bottom surface of the base portion 310. The polarizing layer PLa may be between the input-sensing layer TLa and the display panel 500 (e.g., between the input-sensing layer TLa and the first bonding layer 400).

Figure 10:
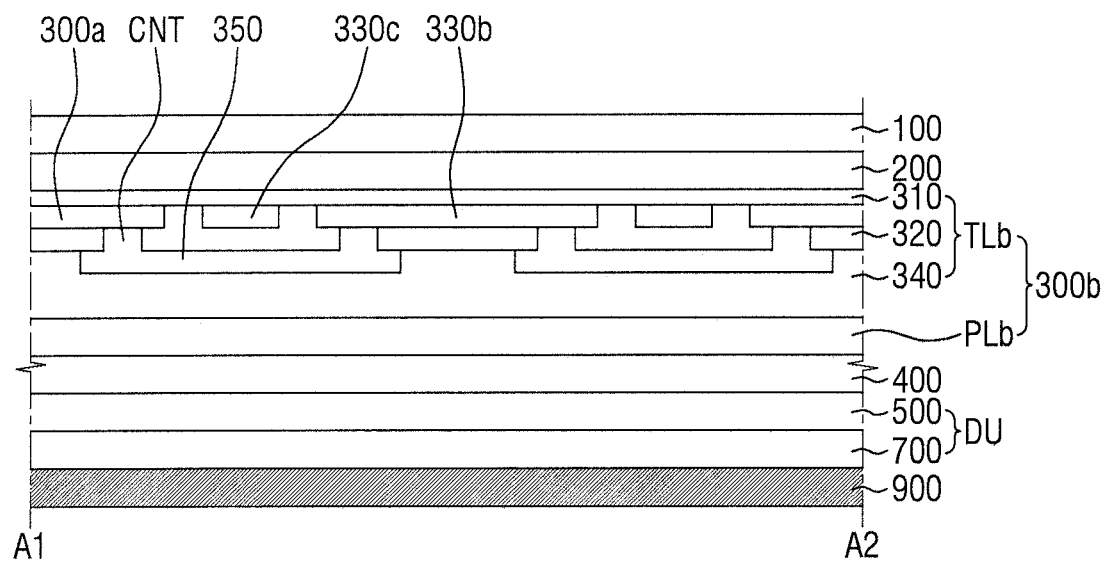
FIG. 10 is a cross-sectional view illustrating another modified example of the input-sensing member of FIG. 8.

FIG. 10 is a cross-sectional view illustrating another modified example of the input-sensing member of FIG. 8.

Referring to FIG. 10, an input-sensing member 300b may include an input-sensing layer TLb and a polarizing layer PLb.

The input-sensing layer TLb is substantially the same as the input-sensing layer TLa of FIG. 9, except that sensing electrodes (330a, 330b, 330c, and 350) and first and second insulating layers 320 and 340 are on a surface of a base portion 310 that instead faces the display panel 500, for example, on the bottom surface of the base portion 310.

The polarizing layer PLb may be on the second insulating layer 340 and the display panel 500 (e.g., between the second insulating layer 340 and the first bonding layer 400).

Figure 11:
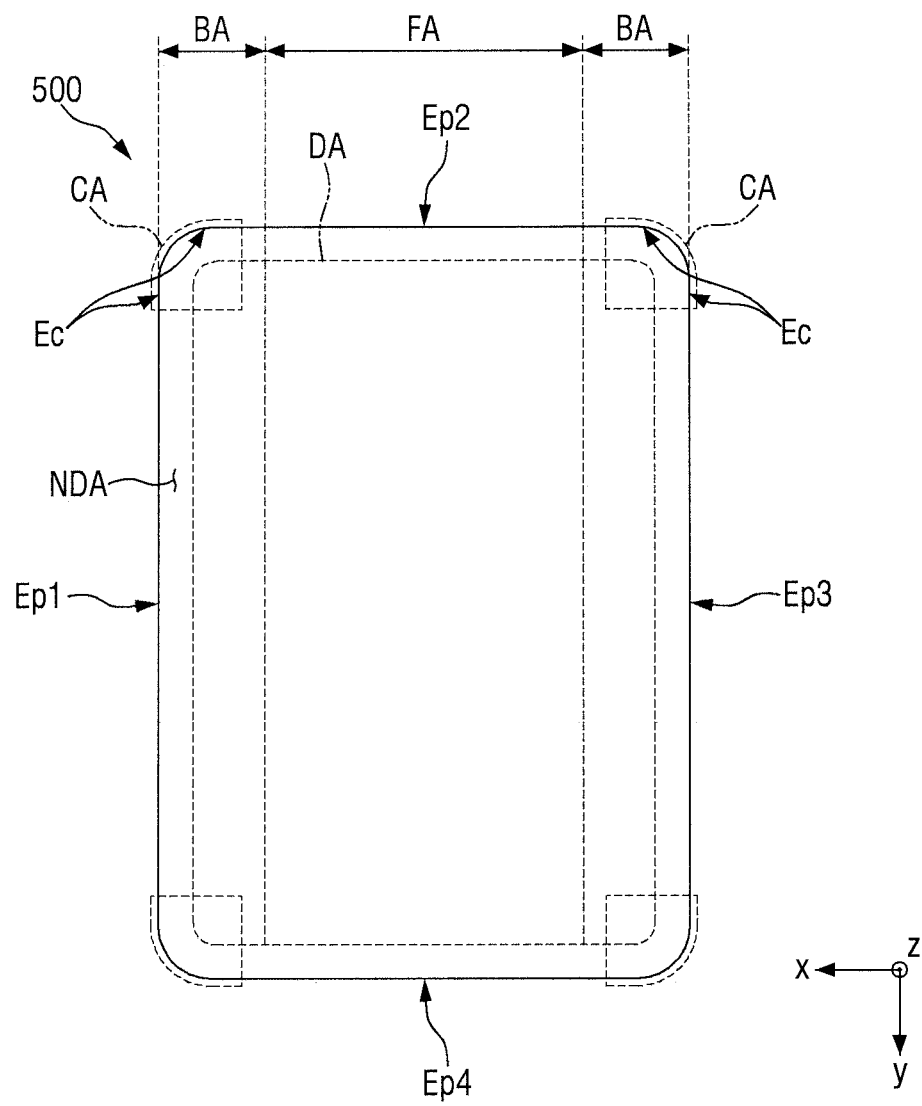
FIG. 11 is a bottom view illustrating a display panel of FIG. 2.

FIG. 11 is a bottom view illustrating the planar structure of the display panel of FIG. 2.

Referring to FIGS. 1, 2, and 11, the display panel 500 includes a first edge Ep1, which extends along the second direction y, a second edge Ep2, which extends along the first direction x, a third edge Ep3, which is opposite to the first edge Ep1 with the display area DA therebetween, and a fourth edge Ep4, which is opposite to the second edge EP2 with the display area DA therebetween.

The display panel 500 may include corner portions CA, and the corner portions CA may be in the bent areas BA of the display device 1000. The corner portions CA may be on the outer sides of the display area DA and may partially include the display area DA. In some embodiments, each of the corner portions CA may be at a location where respective ends of a pair of neighboring edges, among the first, second, third, and fourth edges Ep1, Ep2, Ep3, and Ep4, face each other.

For example, an edge Ec of a corner portion CA between the first and second edges Ep1 and Ep2 may connect the first and second edges Ep1 and Ep2. The edges Ec of each of the corner portions CA may each connect a respective pair of neighboring edges, among the first, second, third, and fourth edges Ep1, Ep2, Ep3, and Ep4. In some embodiments, the edges of each of the corner portions CA may have a round shape.

Figure 12A:
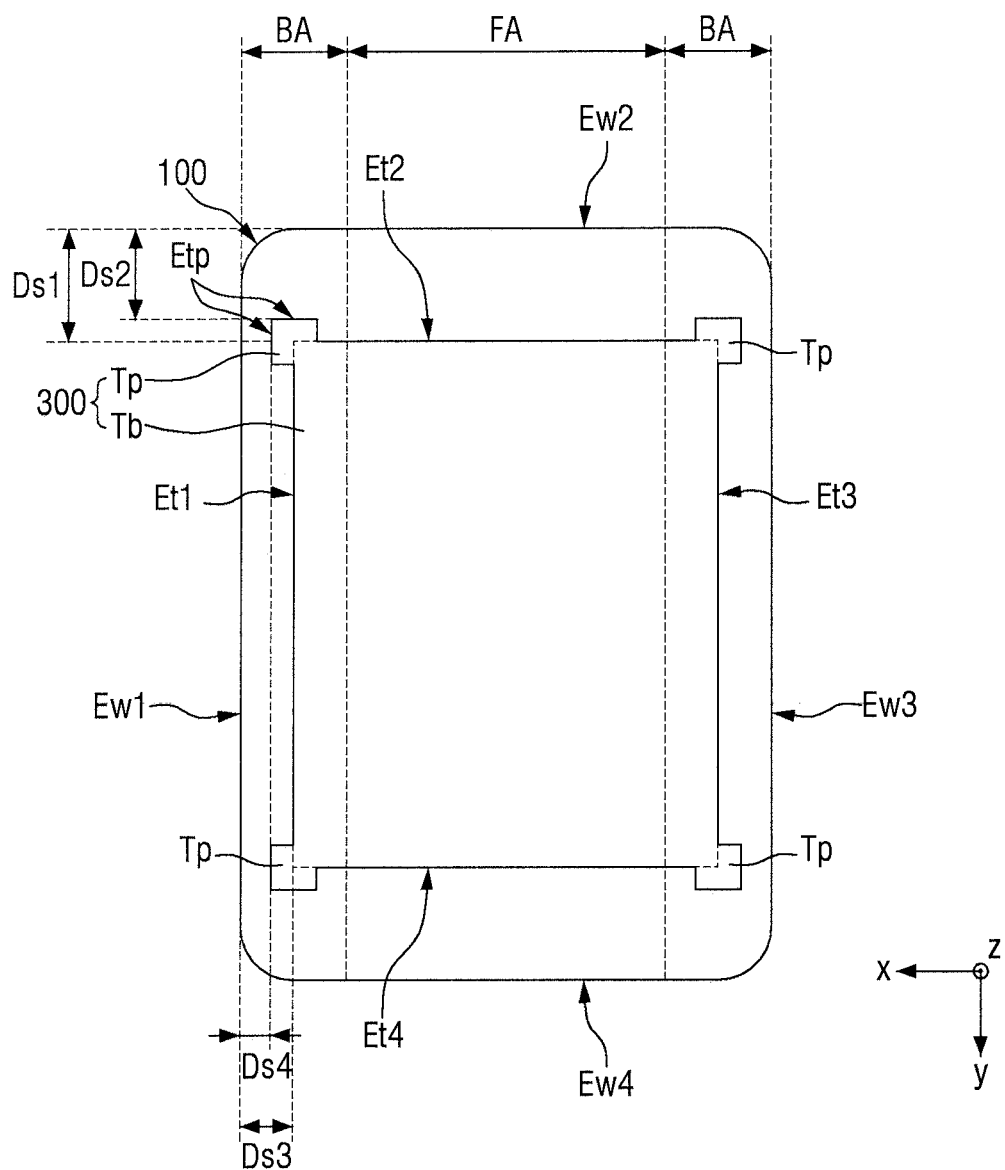
FIG. 12A is a bottom view illustrating an input-sensing member and a window of FIG. 2.

FIG. 12A is a bottom view illustrating the input-sensing member and the window of FIG. 2.

Referring to FIGS. 1, 2, and 12A, the input-sensing member 300 includes a body portion Tb and the extensions Tp, which extend outwardly from the corners of the body portion Tb.

The body portion Tb may be part of the input-sensing member 300 overlapping with the display panel 500. In some embodiments, the body portion Tb may have a substantially rectangular planar shape.

The extensions Tp, which are portions of the input-sensing member 300 that extend outwardly from the corners of the body portion Tb, may be in the bent areas BA. The extensions Tp are illustrated as being entirely in the bent areas BA, but the present disclosure is not limited thereto. The extensions Tp may be partially in the flat area FA.

In some embodiments, the extensions Tp may be formed by expanding the input-sensing layer TL, TLa, or TLb of FIG. 8, 9, or 10. Alternatively, in other embodiments, the extensions Tp may be formed by expanding the polarizing layer PL, PLa, or PLb of FIG. 8, 9, or 10. Still alternatively, in other embodiments, the extensions Tp may be formed by expanding both the input-sensing layer TL, TLa, or TLb and the polarizing layer PL, PLa, or PLb of FIG. 8, 9, or 10.

A distance (e.g., minimum distance) between edges (Ew1, Ew2, Ew3, and Ew4) of the window 100 and edges (Et1, Et2, Et3, and Et4) of the body portion Tb, measured in a particular direction, may be greater than a distance (e.g., minimum distance) between the edges (Ew1, Ew2, Ew3, and Ew4) of the window 100 and edges Etp of each of the extensions Tp, measured in the particular direction.

For example, the window 100 may include a first edge Ew1, which extends in the second direction, a second edge Ew2, which extends in the first direction x, a third edge Ew3, which is opposite to the first edge Ew1, and a fourth edge Ew4, which is opposite to the second edge Ew2.

The body portion Tb of the input-sensing member 300 includes a first edge Et1, which extends in the second direction y, is adjacent to the first edge Ew1 of the window 100, and is in the bent areas BA, a second edge Et2, which extends in the first direction x and is adjacent to the second edge Ew2 of the window 100, a third edge Et3, which is opposite to the first edge Et1 and is in one of the bent areas BA, and a fourth edge Et4, which is opposite to the second edge Et2. The edges Etp of each of the extensions Tp may connect a pair of neighboring edges among the first, second, third, and fourth edges Et1, Et2, Et3, and Et4 of the body portion Tb.

For example, a distance (e.g., minimum distance) Ds3 between the first edge Ew1 of the window 100 and the first edge Et1 of the body portion Tb, as measured in the bent areas BA in the first direction x, may be greater than a distance (e.g., minimum distance) Ds4 between the first edge Ew1 of the window 100 and corresponding edges Etp of each of the extensions Tp, as measured in the bent areas BA in the first direction x.

Also, a distance (e.g., minimum distance) Ds1 between the second edge Ew2 of the window 100 and the second edge Et2 of the body portion Tb, as measured in the bent areas BA in the second direction y, may be greater than a distance (e.g., minimum distance) Ds2 between the second edge Ew2 of the window 100 and corresponding edges Etp of each of the extensions Tp, measured in the bent areas BA in the second direction y.

The edges Etp of each of corresponding extensions Tp may include portions that extend beyond the first edge Et1 of the body portion Tb in the first direction x. Also, the edges Etp of each of corresponding extensions Tp may include portions that extend beyond the second edge Et2 of the body portion Tb in the second direction y.

Figure 12B:
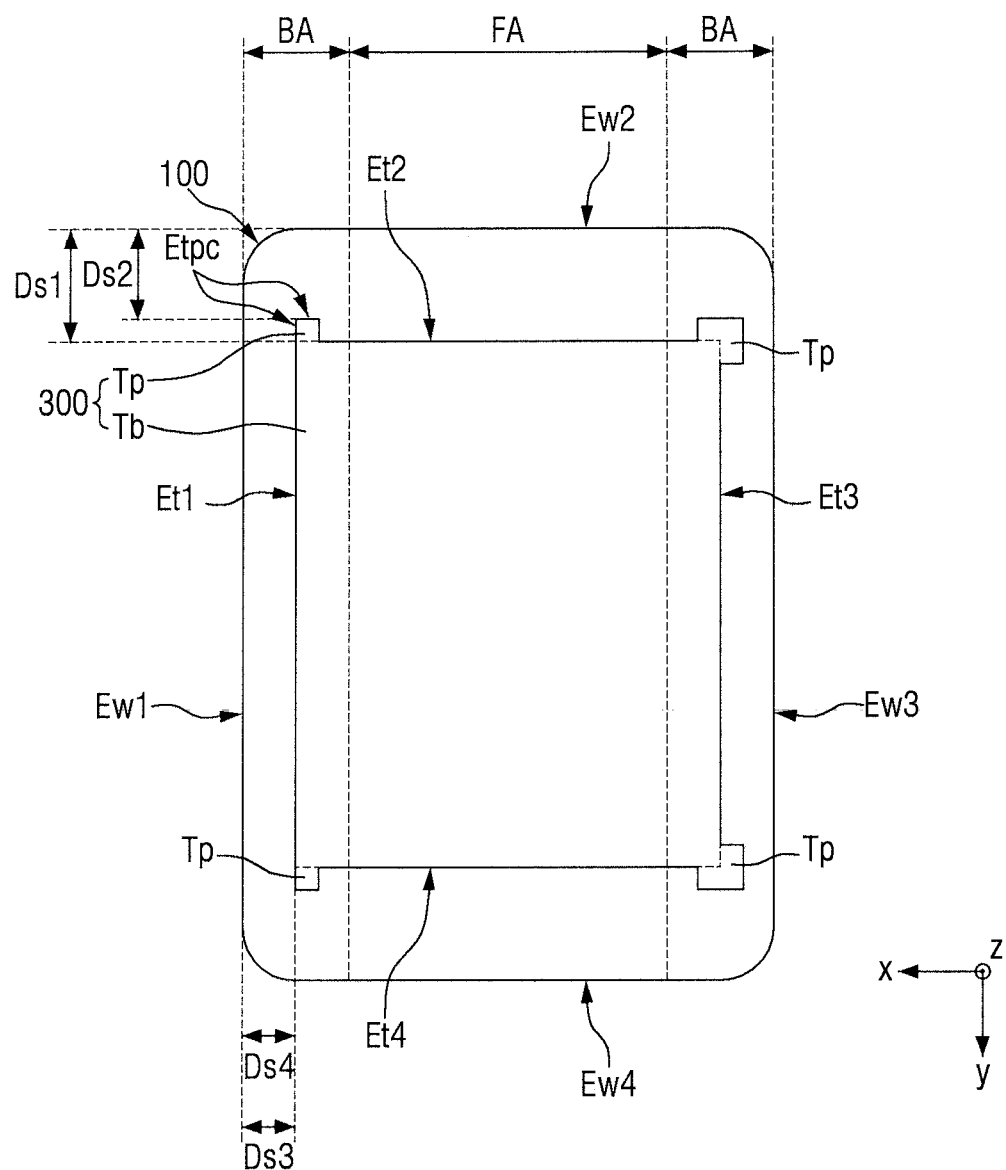
FIG. 12B is a bottom view illustrating a modified example of the input-sensing member of FIG. 12A.

FIG. 12B is a bottom view illustrating a modified example of the input-sensing member of FIG. 12A.

Referring to FIGS. 1, 2, and 12B, an input-sensing member 300c includes a body portion Tb and extensions TPc, which extend outwardly from the corners of the body portion Tb.

Edges Etpc of each of corresponding extensions Tpc may include portions that extend beyond a second edge Et2 of the body portion Tb in an opposite direction to the second direction y. The edges Etpc of each of the extensions Tpc, unlike the edges Etp of the extensions Tp, may omit portions that extend beyond a first edge Et1 of the body portion Tb in the first direction x/extend beyond a third edge Et3 of the body portion Tb in the first direction x.

In some embodiments, a distance (e.g., minimum distance) Ds1 between a second edge Ew2 of the window 100 and the second edge Et2 of the body portion Tb, as measured in the bent areas BA in the second direction y, may be greater than a distance (e.g., minimum distance) Ds2 between the second edge Ew2 of the window 100 and the edges Etpc of each of corresponding extensions Tpc, as measured in the bent areas BA in the second direction y.

Also, in some embodiments, a distance (e.g., minimum distance) Ds3 between a first edge Ew1 of the window 100 and the first edge Et1 of the body portion Tb, as measured in the bent areas BA in the first direction x, may be substantially the same as a distance (e.g., minimum distance) Ds4 between the first edge Ew1 of the window 100 and the edges Etpc of each of the corresponding extensions Tpc, as measured in the bent areas BA in the first direction x.

Figure 13:
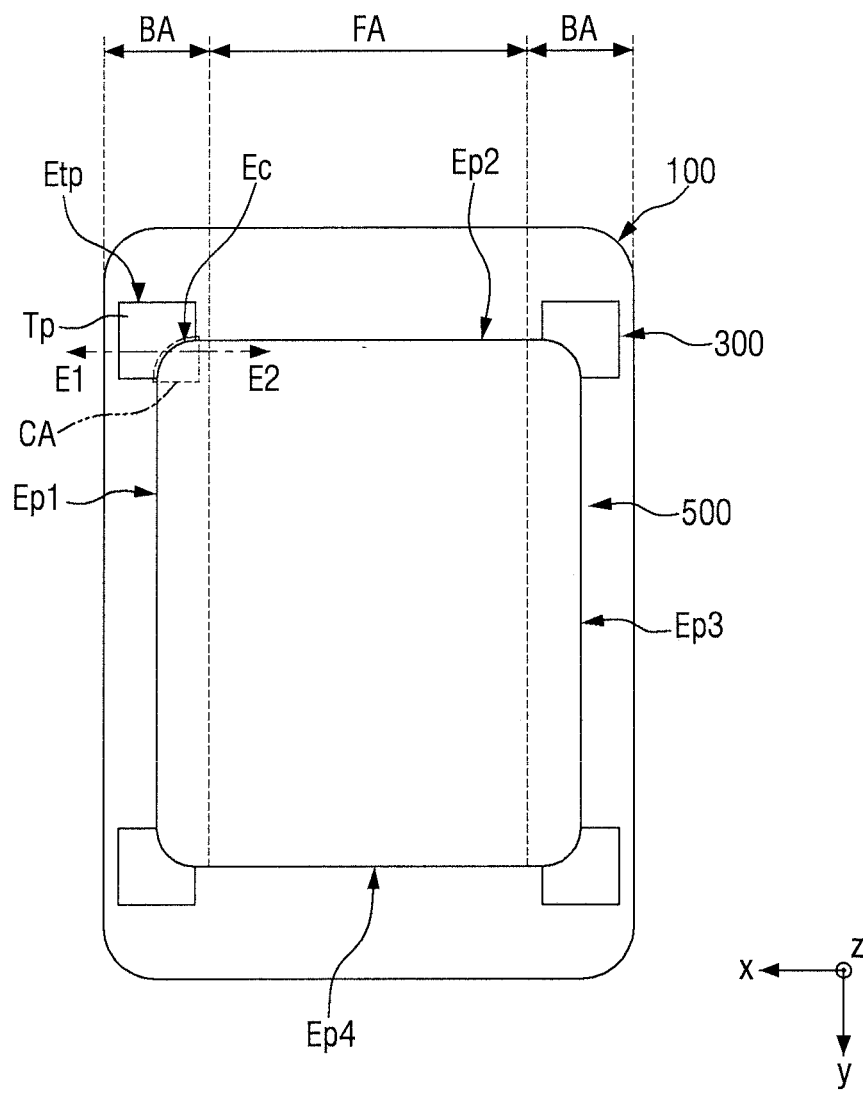
FIG. 13 is a bottom view illustrating the display panel of FIG. 11 and the input-sensing member and the window of FIG. 12A in a state of being coupled together.
Figure 14:
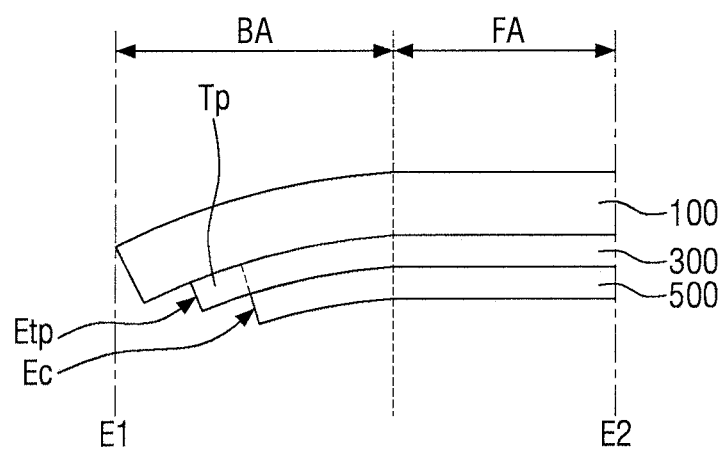
FIG. 14 is a cross-sectional view, taken along the line E1-E2 of FIG. 13, illustrating the window, the input-sensing member, and the display panel of FIG. 13.

FIG. 13 is a bottom view illustrating the display panel of FIG. 11 and the input-sensing member and the window of FIG. 12A in a state of being coupled together, and FIG. 14 is a cross-sectional view, taken along the line E1-E2 of FIG. 13, illustrating the window, the input-sensing member, and the display panel of FIG. 13. The first bonding layer 400 is not illustrated in FIGS. 13 and 14.

Referring to FIGS. 11, 12A, 13, and 14, the extensions Tp of the input-sensing member 300 may protrude outwardly beyond the corner portions CA of the display panel 500 in the bent areas BA. That is, the extensions Tp do not overlap with the display panel 500, and the bottom surfaces of the extensions Tp are not placed in contact with the top surface of the display panel 500.

The edges Etp of each of the extensions Tp are positioned outside the edges Ec of each of corresponding corner portions CA, and the term "outwardly" or "outside", as used herein, may refer to a direction toward the outside of the window 100 on a plane, or to a direction away from the flat area FA on a plane.

In some embodiments, the edges Ec of each of the corner portions CA may be completely surrounded by the edges Etp of each of the respective extensions Tp.

Figure 15:
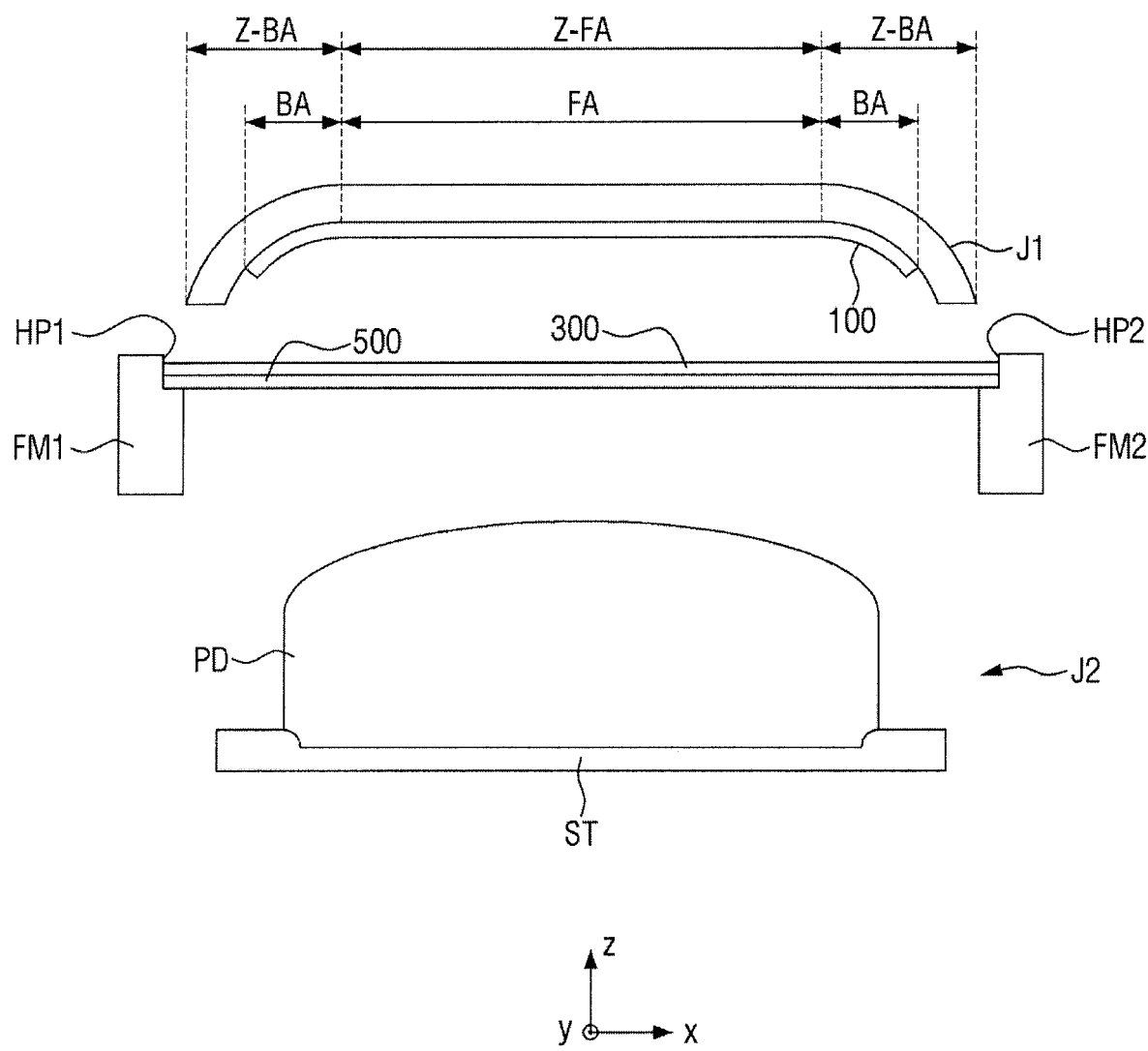
FIGS. 15 through 17 are cross-sectional views illustrating how to couple a window, an input-sensing member, and a display panel.
Figure 16:
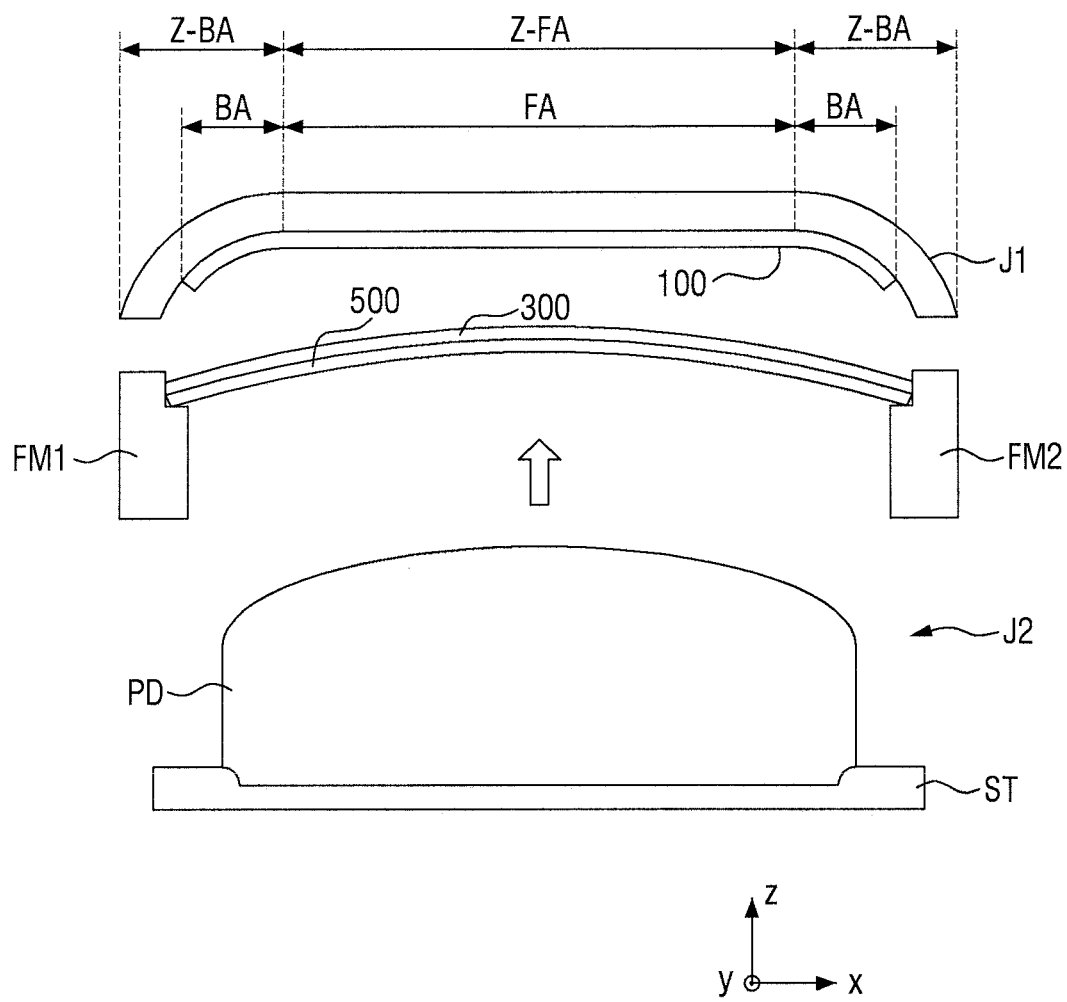
Figure 17:
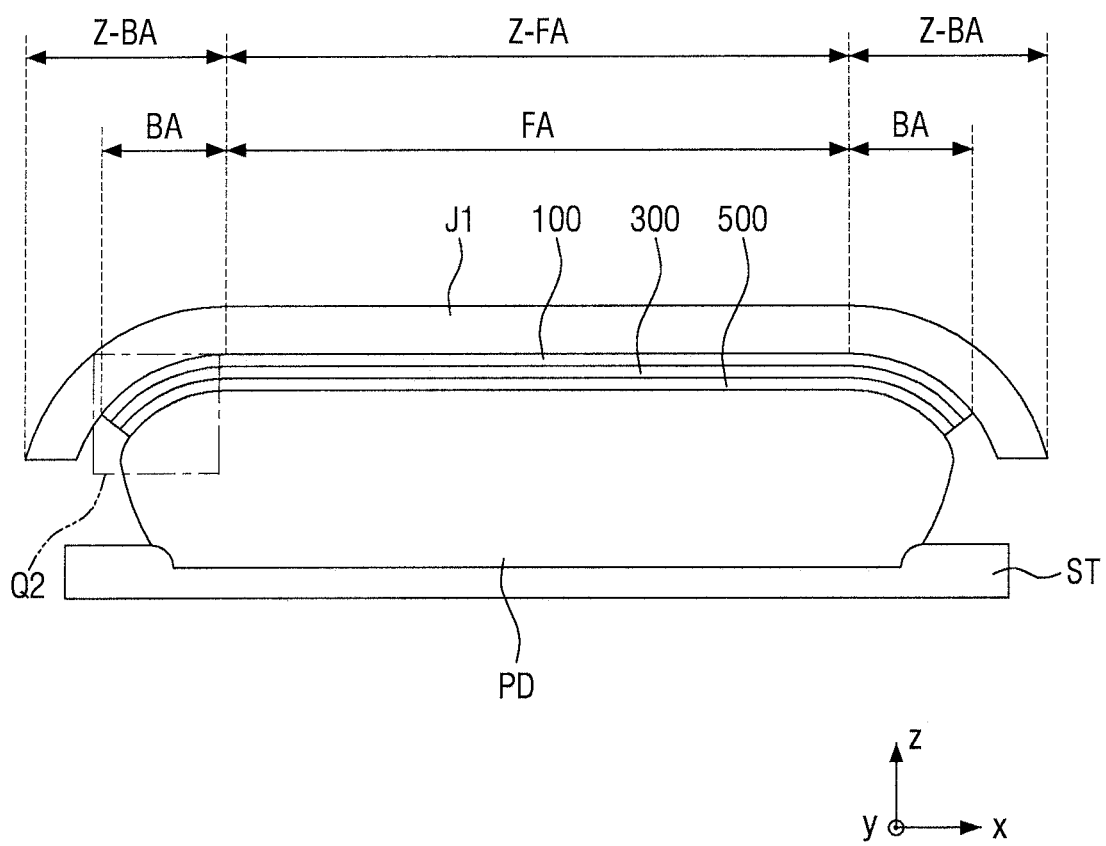
Figure 18:
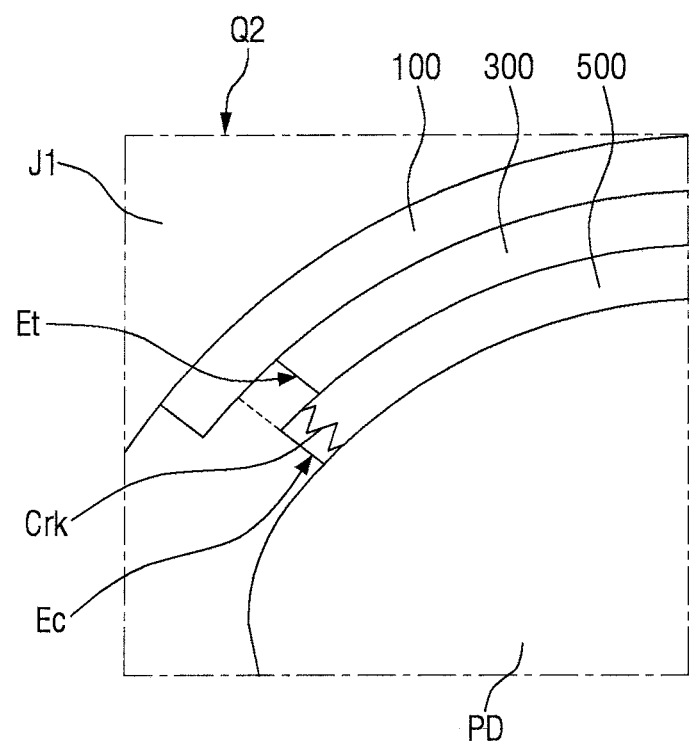
FIGS. 18 and 19 are enlarged cross-sectional views of an area Q2 of FIG. 17, and particularly, cross-sectional views illustrating an input-sensing member with no extensions and an input-sensing member with extensions, respectively.
Figure 19:
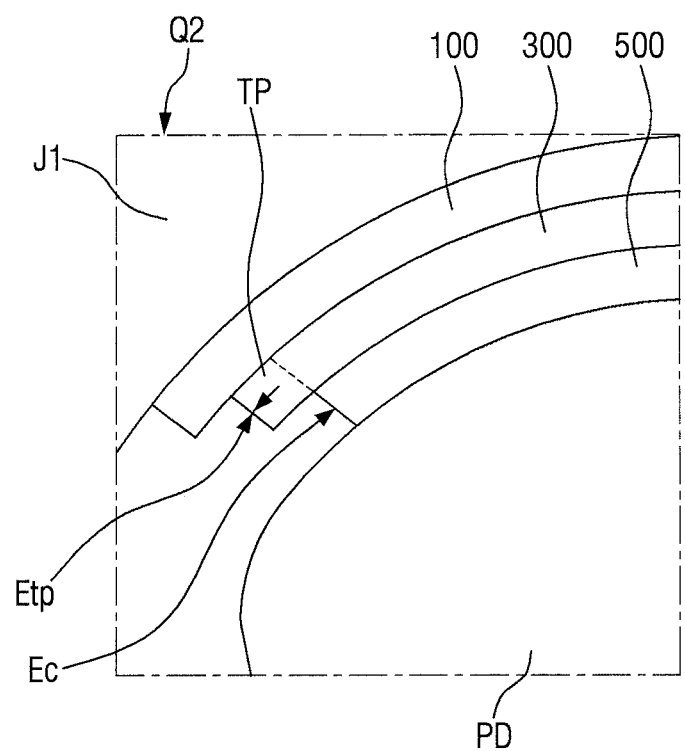

FIGS. 15 through 17 are cross-sectional views illustrating how to couple a window, an input-sensing member, and a display panel, and FIGS. 18 and 19 are enlarged cross-sectional views of an area Q2 of FIG. 17. FIG. 18 is a cross-sectional view illustrating an input-sensing member with no extensions, and FIG. 19 is a cross-sectional view illustrating an input-sensing member with extensions.

Referring to FIGS. 15 through 19, a coupling device may include a first jig J1, a second jig J2, and fixing portions (FM1 and FM2).

The first jig J1 may be on the second jig J2. The first jig J1 may be on the window 100 to hold the window 100. The top surface of the window 100 may be placed in contact with the bottom surface of the first jig J1.

The first jig J1 may include a jig flat portion Z-FA, and may include zig bent portions Z-BA, which are connected to the jig flat portion Z-FA and are bent. Part of the window 100 corresponding to the flat area FA may be fixed by the jig flat portion Z-FA, and parts of the window 100 corresponding to the bent areas BA may be respectively fixed to the jig bent portions Z-BA.

The second jig J2 may be below the first jig J1. The second jig J2 may move in the third direction z to be coupled to the first jig J1 via the display panel 500, the input-sensing member 300, and the window 100, or may move in an opposite direction to the third direction z to be separated from the first jig J1. Alternatively, the first jig J1 may move with respect to the second jig J2.

The fixing portions (FM1 and FM2) may be on at least one side of the second jig J2. In some embodiments, the fixing portions (FM1 and FM2) may include first and second fixing portions FM1 and FM2, which are on respective sides of the second jig J2. The first and second fixing portions FM1 and FM2 may be spaced apart from each other in the first direction x to face each other. The first and second fixing portions FM1 and FM2 may hold the display panel 500 and the input-sensing member 300 to place the display panel 500 and the input-sensing member 300 between the first and second jigs J1 and J2.

The first fixing unit FM1 may include a first holding portion HP1 for holding first ends of the display panel 500 and the input-sensing member 300, and the second fixing unit FM2 may include a second holding portion HP2 for holding second ends of the display panel 500 and the input-sensing member 300.

The second jig J2 may include a stage ST and a pad PD. The pad PD may comprise an elastic material such as silicone, urethane, rubber, or the like. In response to an external force being applied to at least part of the pad PD, the shape of the pad PD may be deformed. Then, in response to the external force applied to the pad PD disappearing, the pad PD may return to its original shape.

The stage ST may be below the pad PD and may support the pad PD. The area of the stage ST may be larger than the area of the pad PD.

It will hereinafter be described how to couple the window 100, the input-sensing member 300, and the display panel 500.

The window 100 is fixed in a bent state to the bottom surface of the first jig J1 including the jig flat portion Z-FA and the jig bent portions Z-BA.

The input-sensing member 300 is coupled onto the display panel 500, and the display panel 500 and the input-sensing member 300 are fixed to the first and second fixing portions FM1 and FM2.

Thereafter, the second jig J2 may move in the third direction z. In this case, the first fixing portion FM1 may move in the first direction x, and the second fixing portion FM2 may move in an opposite direction to the first direction x (e.g., to pinch the display panel 500 and the input-sensing member 300). As a result, the distance between the first and second fixing portions FM1 and FM2 may gradually decrease. Accordingly, the display panel 500 and the input-sensing member 300 may be bent in a convex manner to become closer to the window 100.

The pad PD may move in the third direction z to be placed in contact with the bottom surface of the display panel 500. The pad PD may press the display panel 500 and may thus firmly adhere the input-sensing member 300 to the window 100. In this case, the first fixing portion FM1 may move in the direction opposite to the first direction x, and the second fixing portion FM2 may move in the first direction x. As a result, the display panel 500 and the input-sensing member 300 may be placed between the pad PD and the window 100, away from the first and second fixing portions FM1 and FM2.

The pad PD may further press the display panel 500 to increase the adhesion between the display panel 500, the input-sensing member 300, and the window 100. While the display panel 500 is being pressed by the pad PD, the shape of the pad PD may be temporarily deformed according to the bent shape of the first jig J1. The pad PD may be deformed severely on the edges of the display panel 500, especially in the area Q2, which is an area near one of the corner portions CA of the display panel 500. Accordingly, a strong pressing force can be applied to the edges of the display panel 500, and the pressing force can be concentrated particularly around the area Q2.

If the input-sensing member 300 has a smaller area than the display panel 500 or if a misalignment occurs during the coupling of the display panel 500 and the input-sensing member 300, the input-sensing member 300 may not be placed on the edges of the display panel 500 (e.g., in the area Q2, as illustrated in FIGS. 17 and 18). In other words, an edge Ec of the display panel 500 may be positioned outside an edge Et of the input-sensing member 300.

In this case, because the pressing force applied by the pad PD can be concentrated around the area Q2, a crack Crk may be highly likely to be formed in the display panel 500. When the edge Ec of the display panel 500 has a round shape, the likelihood of the formation of the crack Crk may further increase.

On the other hand, according to the present disclosure, an extension Tp of the input-sensing member 300 may be in the area Q2 of the display panel 500, as illustrated in FIG. 19, and may serve as a supporting member or a buffer member. Accordingly, the likelihood of the formation of a crack in the area Q2 can be lowered, and as a result, a display device with an improved reliability can be provided.

Figure 20:
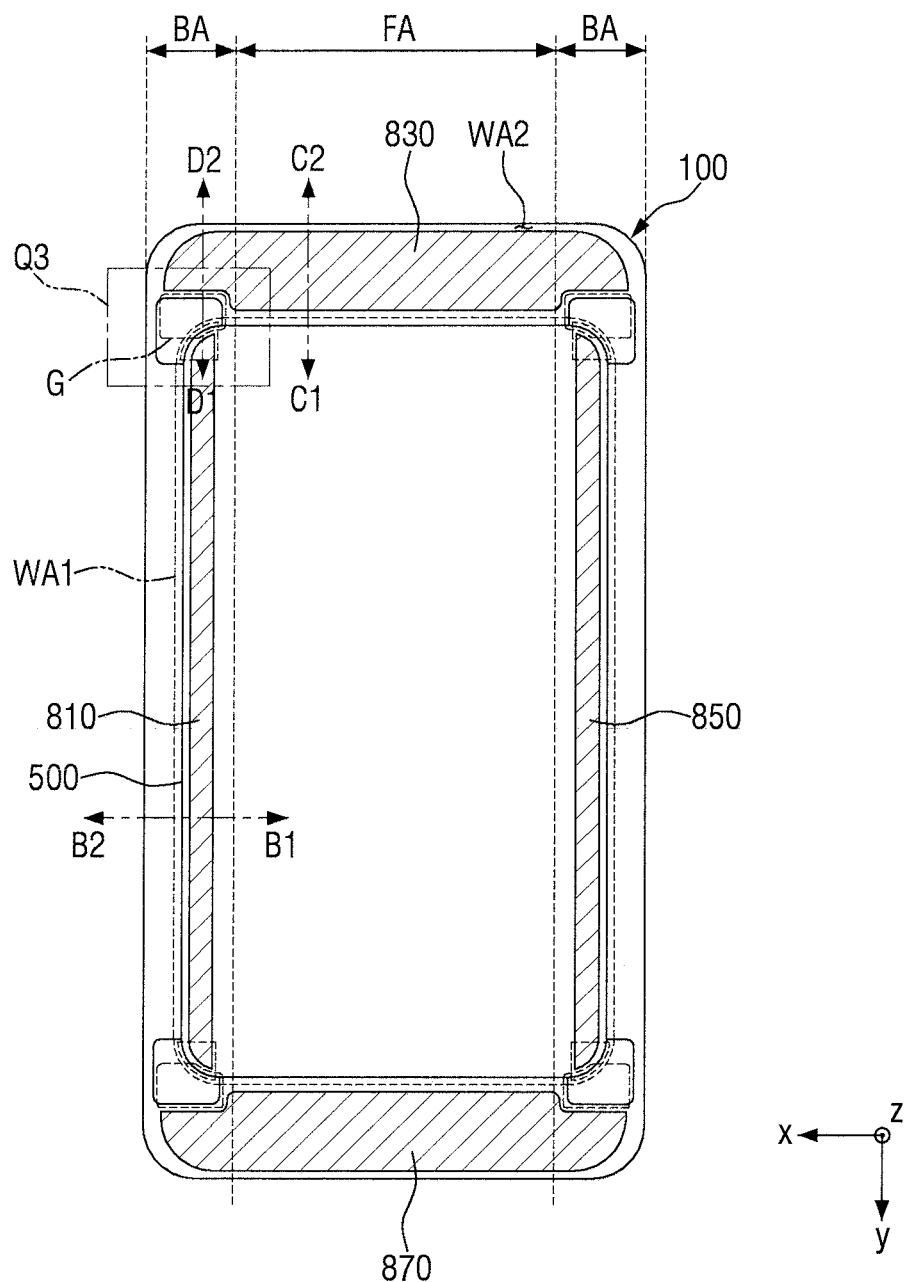
FIG. 20 is a bottom view of the display device of FIG. 1 with a bracket omitted from illustration.
Figure 21:
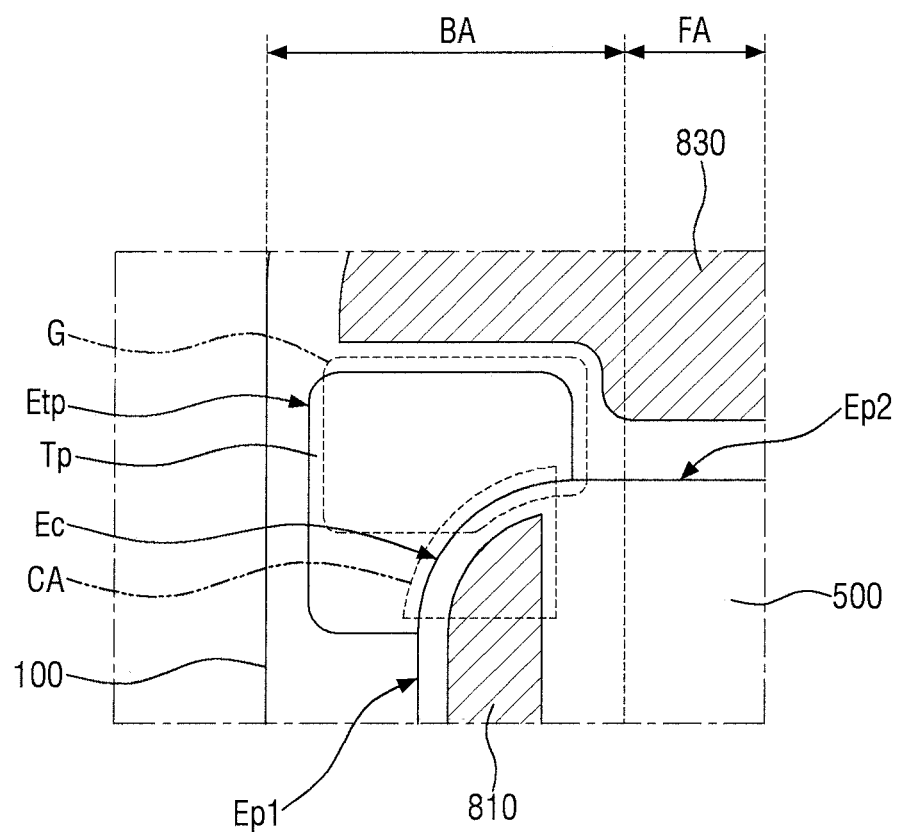
FIG. 21 is an enlarged bottom view of an area Q3 of FIG. 20.
Figure 22:
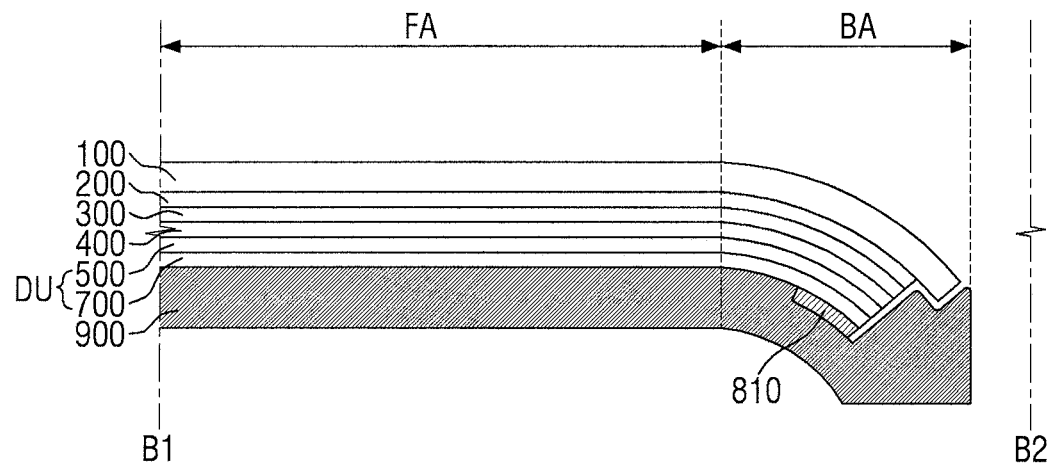
FIG. 22 is a cross-sectional view taken along the line B1-B2 of FIGS. 1 and 20.
Figure 23:
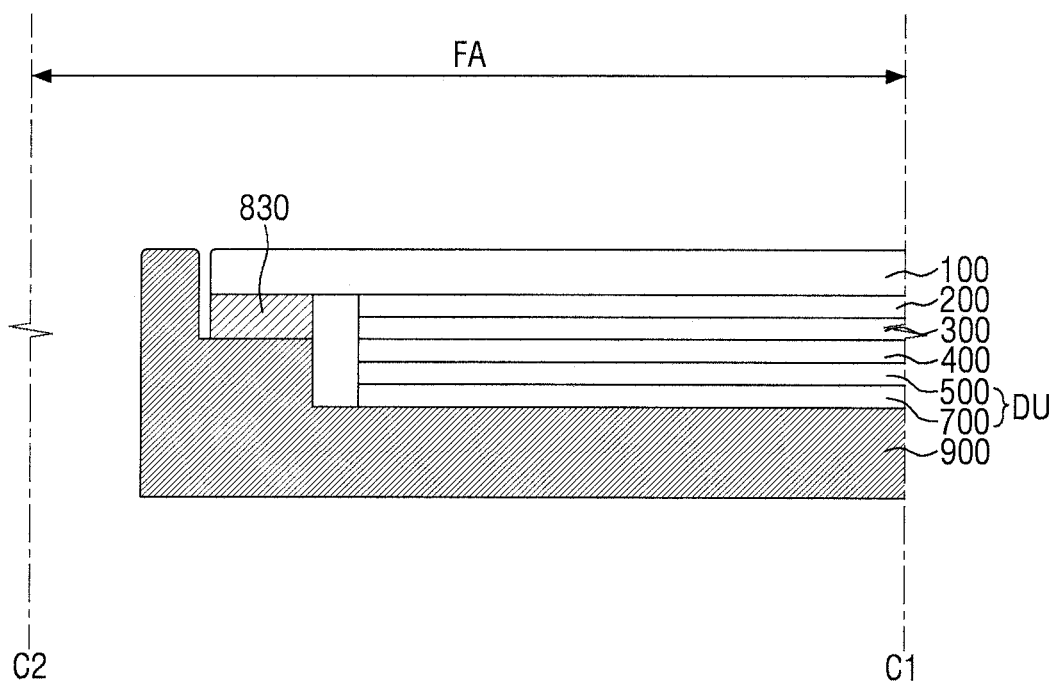
FIG. 23 is a cross-sectional view taken along the line C1-C2 of FIGS. 1 and 20.
Figure 24:
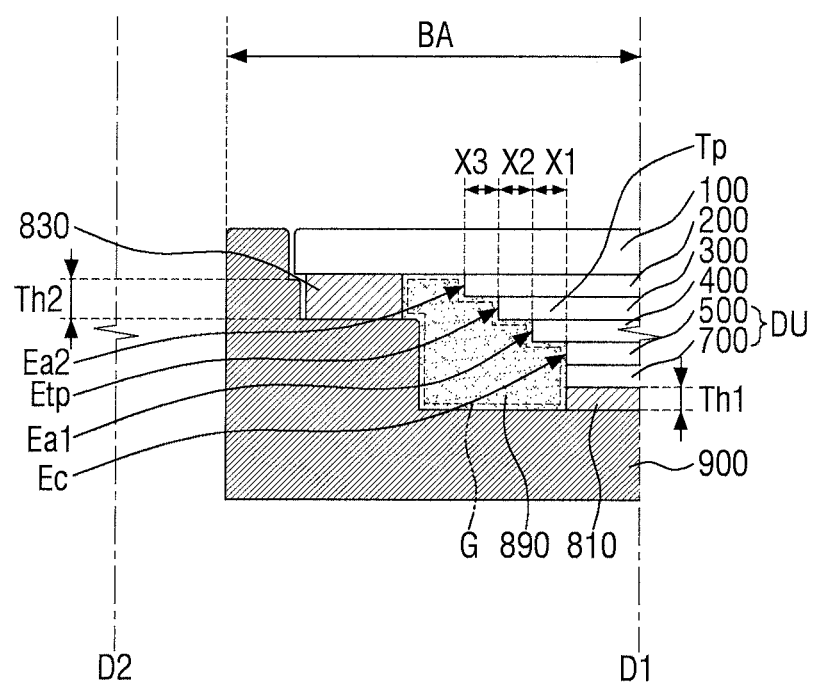
FIG. 24 is a cross-sectional view taken along the line D1-D2 of FIGS. 1 and 20.

FIG. 20 is a bottom view of the display device of FIG. 1 with the bracket omitted from illustration, FIG. 21 is an enlarged bottom view of an area Q3 of FIG. 20, FIG. 22 is a cross-sectional view taken along the line B1-B2 of FIGS. 1 and 20, FIG. 23 is a cross-sectional view taken along the line C1-C2 of FIGS. 1 and 20, and FIG. 24 is a cross-sectional view taken along the line D1-D2 of FIGS. 1 and 20.

Referring to FIGS. 1, 11, 12, and 20 through 24, below the display panel 500, a first waterproof member 810 may be located along the first edge Ep1 of the display panel 500, and a third waterproof member 850 may be located along the third edge Ep3 of the display panel 500. In some embodiments, the first and third waterproof members 810 and 850 may extend along the second direction y and may be below the panel lower member 700 of the display module DU.

When the window 100 is divided into a first area Wa1, which overlaps with the display panel 500, and a second area Wa2, which does not overlap with the display panel 500. A second waterproof member 830, which is adjacent to the second edge Ep2 of the display panel 500 and is spaced apart from the display panel 500, and a fourth waterproof member 870, which is adjacent to the fourth edge Ep4 of the display panel 500 and is spaced apart from the display panel 500, may be in the second area Wa2 on the bottom surface of the window 100.

In some embodiments, the second and fourth waterproof members 830 and 870 may extend along the first direction x and may be spaced apart from the display panel 500.

In some embodiments, the first and third waterproof members 810 and 850 may be in respective bent areas BA, and the second and fourth waterproof members 830 and 870 may be in and across the flat area FA and the bent areas BA.

In some embodiments, the first, second, third, and fourth waterproof members 810, 830, 850, and 870 may be formed as double-sided tape having adhesiveness on both sides thereof. First surfaces of the first and third waterproof members 810 and 850 may be attached to the panel lower member 700, and second surfaces of the first and third waterproof members 810 and 850 may be attached to the bracket 900. In a case where the panel lower member 700 includes the buffer member 710 or 710a (of FIG. 4 or 5) and the heat dissipating member 750 or 750a (of FIG. 4 or 5), first surfaces of the second and fourth waterproof members 830 and 870 may be attached to the bottom surface of the heat dissipating member 750 or 750a.

The first and second waterproof members 810 and 830 may be spaced apart from each other in the second direction y by a gap G near a corresponding corner area CA of the display panel 500. Similarly, the first and fourth waterproof members 810 and 870, the third and second waterproof members 850 and 830, or the third and fourth waterproof members 850 and 870 may be spaced apart from each other in the second direction y by a gap G near a corresponding corner area CA of the display panel 500.

For convenience, the first, second, third, and fourth waterproof members 810, 830, 850, and 870 will hereinafter be described, focusing mainly on the first and second waterproof members 810 and 830.

Referring to FIG. 24, a waterproof filling member 890 may be in the gap G between the first and second waterproof members 810 and 830. The waterproof filling member 890 may fill the gap G. The waterproof filling member 890 may be placed in contact with a corner portion CA of the display panel 500, an extension Tp of the input-sensing member 300, the first bonding layer 400, the second bonding layer 200, the window 100, the first waterproof member 810, the second waterproof member 830, and the bracket 900. In some embodiments, the waterproof filling member 890 may comprise a semi-solid or liquid material, and may thus be solidified or hardened by natural or external conditions (for example, heat, ultraviolet (UV) light, and/or pressure).

Similarly, the gaps G between the first and fourth waterproof members 810 and 870, between the third and second waterproof members 850 and 830, and between the third and fourth waterproof members 850 and 870 may also be filled with the waterproof filling member 890, and as a result, moisture can be reduced or prevented from infiltrating into the display device 1000.

As described above, because the second waterproof member 830 is attached to the bottom surface of the window 100, and because the first waterproof member 810 is attached to the bottom surface of the display panel 500, there is a height difference between the first and second waterproof members 810 and 830. Accordingly, to compensate for some of the height difference, a thickness Th2 of the second and fourth waterproof members 830 and 870 may be greater than a thickness Th1 of the first and third waterproof members 810 and 850.

In the area Q3, which is an area near the corner portion CA of the display panel 500 corresponding to the gap G between the first and second waterproof members 810 and 830, an edge Etp of the extension Tp of the input-sensing member 300 may be between the first and second waterproof members 810 and 830 and may be positioned outside at least one of an edge Ea1 of the first bonding layer 400 and an edge Ea2 of the second bonding layer 200.

For example, as illustrated in FIG. 24, in the area Q3, the edge Etp of the extension Tp of the input-sensing member 300 may be positioned outside the edge Ea1 of the first bonding layer 400. That is, in the area Q3, the first bonding layer 400 may have an edge that is in the bent area BA and overlaps with the extension Tp, but not with the display panel 500.

In the area Q3, the edge Ea2 of the second bonding layer 200 may be positioned outside the edge Etp of the extension Tp, and the edge Ea1 of the first bonding layer 400 may be positioned outside the edge Ec of the display panel 500. That is, in the area Q3, the edge Ea1 of the first bonding layer 400 may be between the edge Etp of the extension Tp and the edge Ec of the display panel 500.

For example, referring to FIG. 24, a distance X2 between the edge Etp of the extension Tp and the edge Ea1 of the first bonding layer 400 may be set to range between ~0 mm and about 0.4 mm in consideration of a process margin. Also, a distance X3 between the edge Etp of the extension Tp and the edge Ea2 of the second bonding layer 200, and a distance X1 between the edge Ea1 of the first bonding layer 400 and the edge Ec of the display panel 500 may also be set to range between 0 mm and 0.4 mm in consideration of a process margin. However, the present disclosure is not limited to this example.

In a case where in the area Q3 where the first and second waterproof members 810 and 830 are spaced apart from each other, the edge Ea1 of the first bonding layer 400 and the edge Ea2 of the second bonding layer 200 are both positioned outside the edge of the input-sensing member 300, the first and second bonding layers 400 and 200 may be placed in contact with each other to form a gap, and this gap may not be able to be filled with the waterproof filling member 890. In this case, moisture may infiltrate into the display device 1000 through this gap. As a result, the waterproofness of the display device 1000 may deteriorate, and the reliability and durability of the display device may be degraded.

On the other hand, according to the present disclosure, because in the area Q3, the edge Etp of the extension Tp is positioned outside the edge Ea1 of the first bonding layer 400, the first and second bonding layers 400 and 200 can be prevented from being placed in contact with each other in the area Q3. Accordingly, the formation of gaps that are not filled with the waterproof filling member 890 in and near the corner portions CA of the display panel 500 can be prevented, and as a result, the reliability of the display device 1000 can be improved.

FIGS. 25 through 30 are cross-sectional views illustrating modified examples of the display device of FIG. 23.

Figure 25:
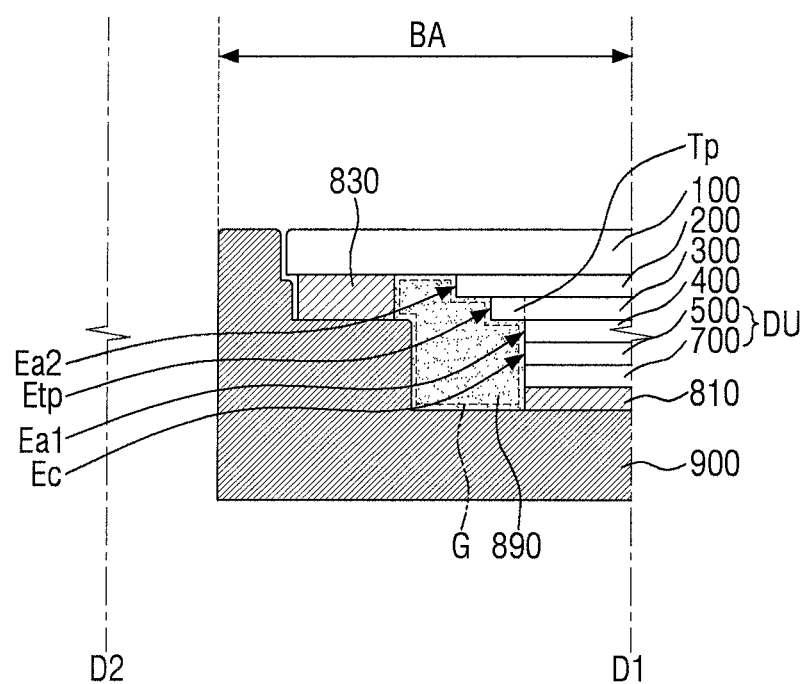
FIGS. 25 through 30 are cross-sectional views illustrating modified examples of the display device of FIG. 23.

Referring to FIG. 25, in the display device of FIG. 25, unlike in the display device of FIG. 24, an edge Ea1 of a first bonding layer 400 may not protrude beyond an edge Ec of a display panel 500, and instead, the edge Ea1 of the first bonding layer 400 and the edge Ec of the display panel 500 may be on substantially the same line. The relationships between an edge Etp of an extension Tp and the edge Ea1 of the first bonding layer 400, and between the edge Etp of the extension Tp and an edge Ea2 of a second bonding layer 200, may be as described above with reference to FIG. 24.

Figure 26:
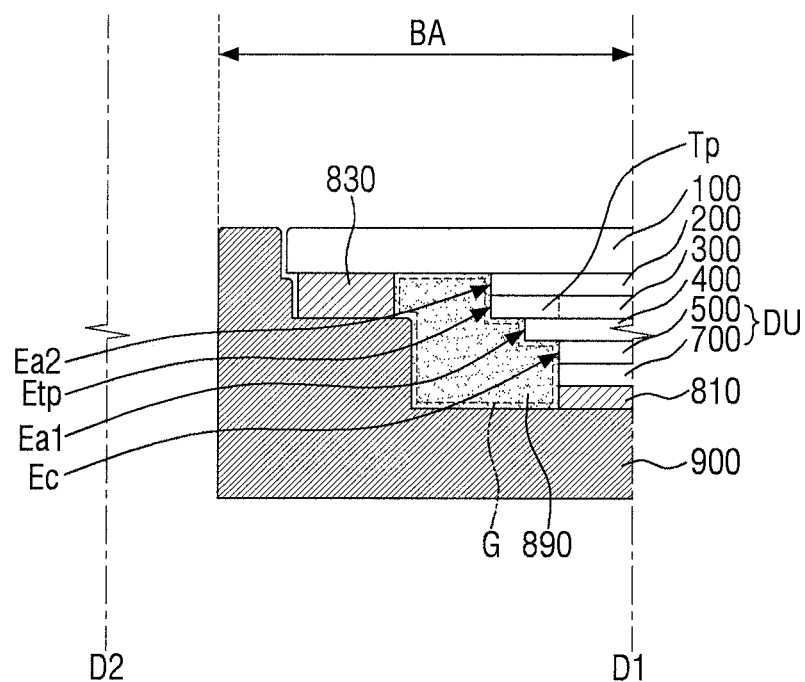

Referring to FIG. 26, in the display device of FIG. 26, unlike in the display device of FIG. 24, an edge Ea2 of a second bonding layer 200 might not protrude beyond an edge Etp of an extension Tp, and instead, the edge Ea2 of the second bonding layer 200 and the edge Etp of the extension Tp may be on substantially the same line. Other elements of the display device of FIG. 25 may be the same as their respective counterparts of the display device of FIG. 24.

Figure 27:
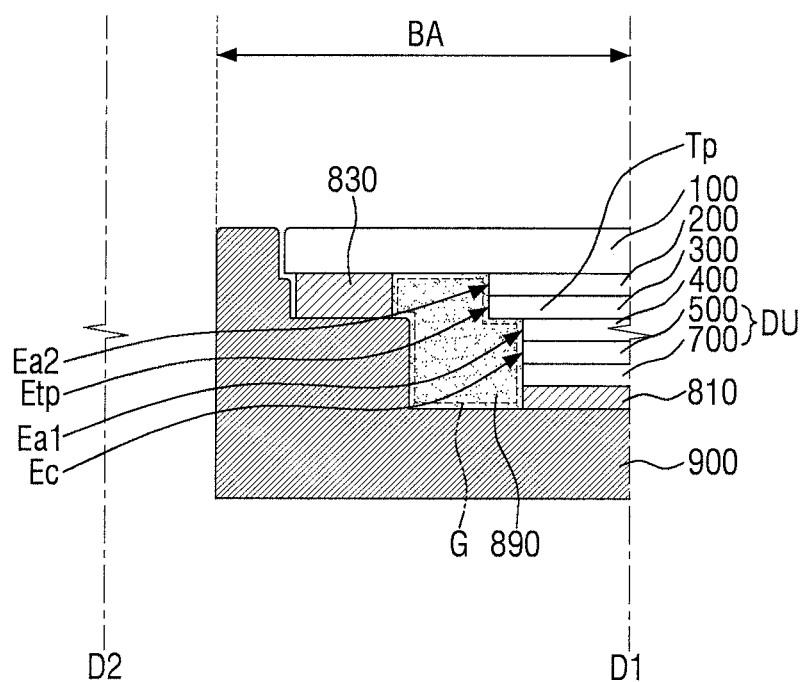

Referring to FIG. 27, in the display device of FIG. 27, unlike in the display device of FIG. 24, an edge Ea2 of a second bonding layer 200 and an edge Etp of an extension Tp may be on substantially the same line, and an edge Ea1 of a first bonding layer 400 and an edge Ec of a display panel 500 may be on substantially the same line. The edge Etp of the extension Tp may be positioned outside the edge Ea1 of the first bonding layer 400, as described above with reference to FIG. 24.

Figure 28:
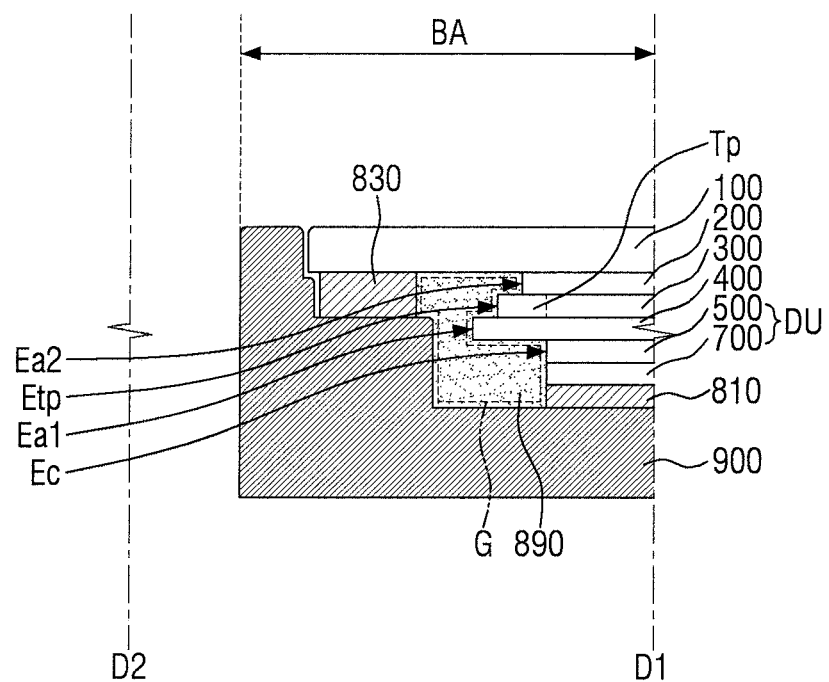

Referring to FIG. 28, in the display device of FIG. 28, unlike in the display device of FIG. 24, an edge Etp of an extension Tp may be positioned outside an edge Ea2 of a second bonding layer 200, and an edge Ea1 of a first bonding layer 400 may be positioned outside an edge Etp of an extension Tp. The edge Ea1 of the first bonding layer 400 may be positioned outside an edge Ec of a display panel 500.

Figure 29:
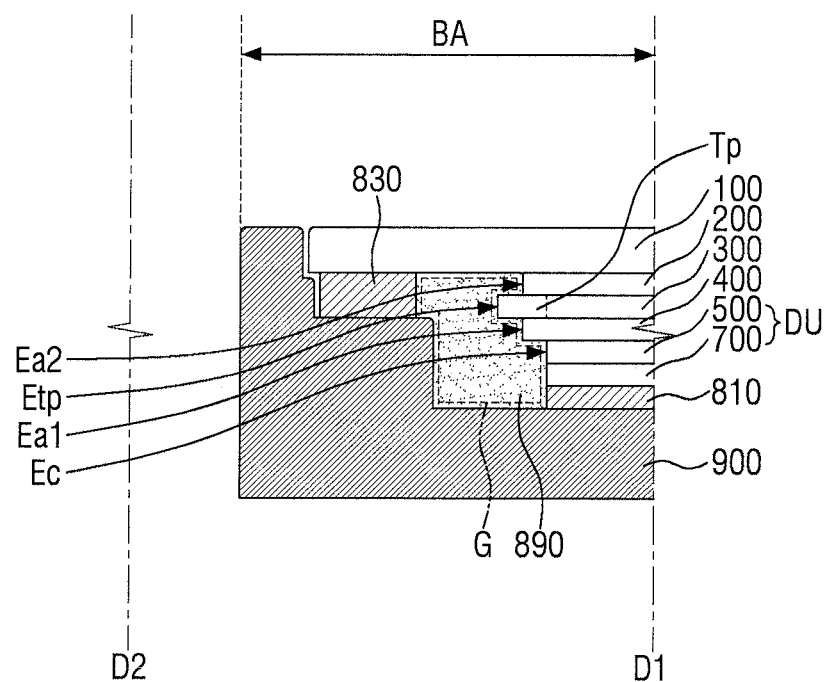

Referring to FIG. 29, in the display device of FIG. 29, unlike in the display device of FIG. 24, an edge Etp of an extension Tp may be positioned outside an edge Ea2 of a second bonding layer 200 and an edge Ea1 of a first bonding layer 400. Also, the edge Eat of the first bonding layer 400 may be positioned outside an edge Ec of a display panel 500.

Figure 30:
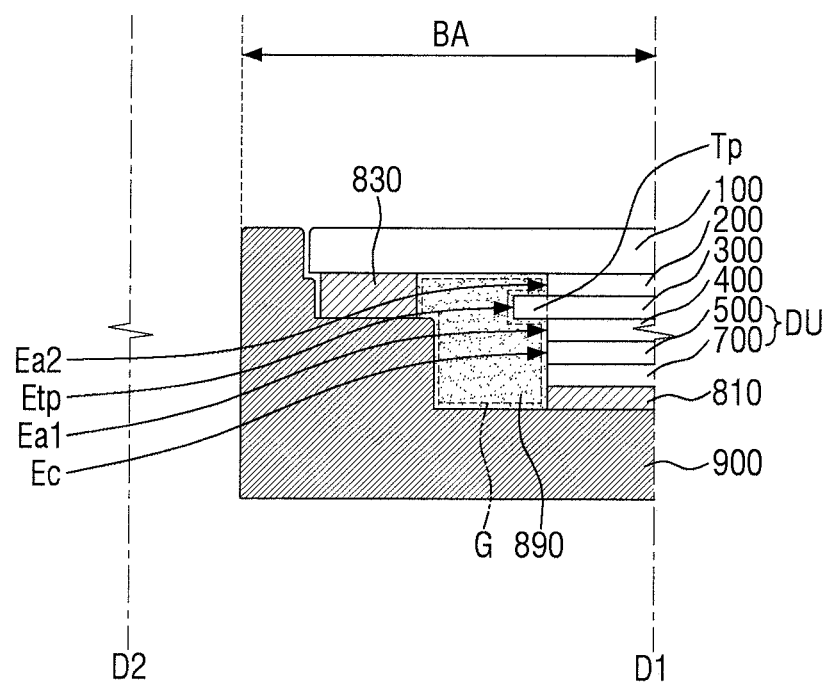

Referring to FIG. 30, in the display device of FIG. 30, unlike in the display device of FIG. 29, an edge Ea1 of a first bonding layer 400 and an edge Ec of a display panel 500 may be on substantially the same line. Other elements of the display device of FIG. 30 may be the same as their respective counterparts of the display device of FIG. 29.

Because (in the display device 1000) the input-sensing member 300 includes the extensions Tp, the likelihood of the formation of cracks in the display panel 500 during the manufacture of the display device 1000 can be lowered. Also, because the edges Etp of the extensions Tp of the input-sensing member 300 are positioned on the outer side of at least one of the edge Ea1 of the first bonding layer 400 and the edge Ea2 of the second bonding layer 200, the formation of gaps can be prevented, and as a result, the infiltration of moisture or the like into the display device 1000 can be effectively reduced or prevented.

Figure 31:
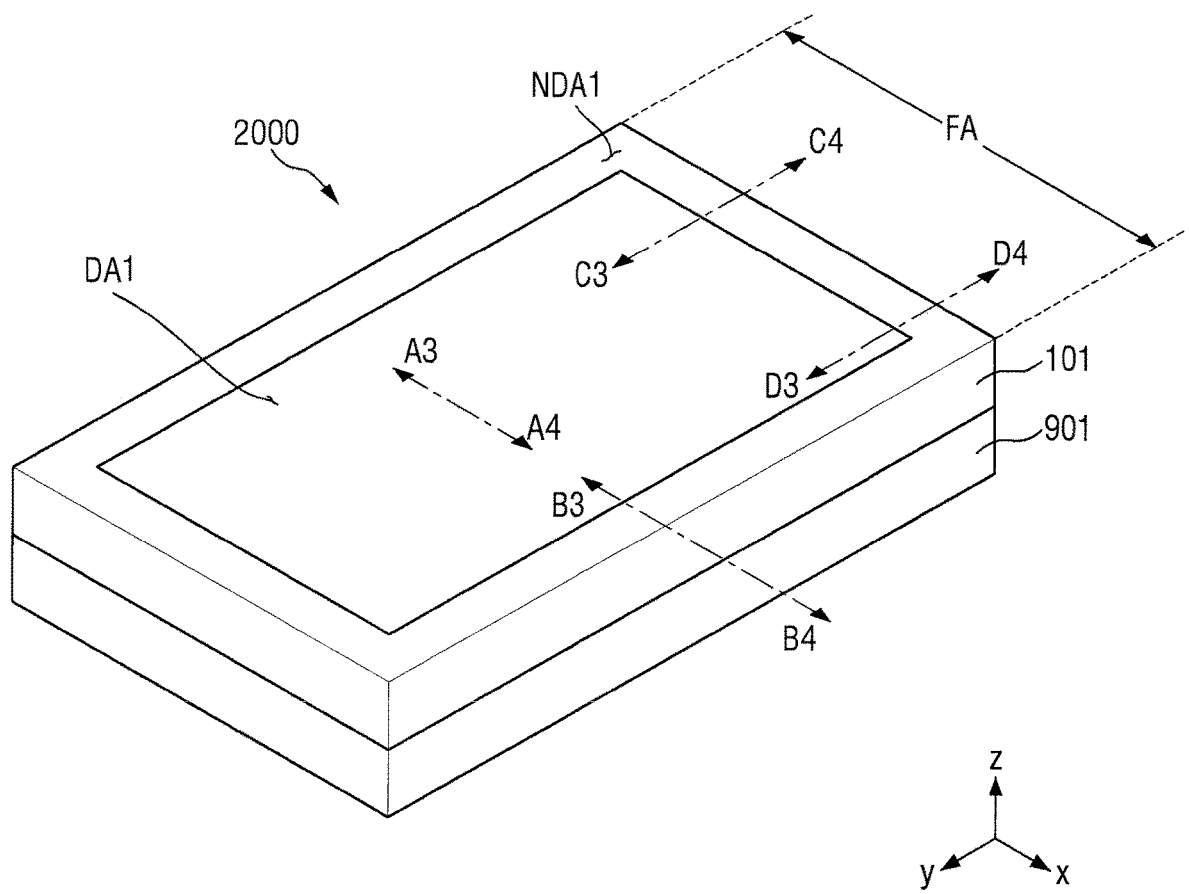
FIG. 31 is a perspective view of a display device according to another embodiment of the present disclosure.
Figure 32:
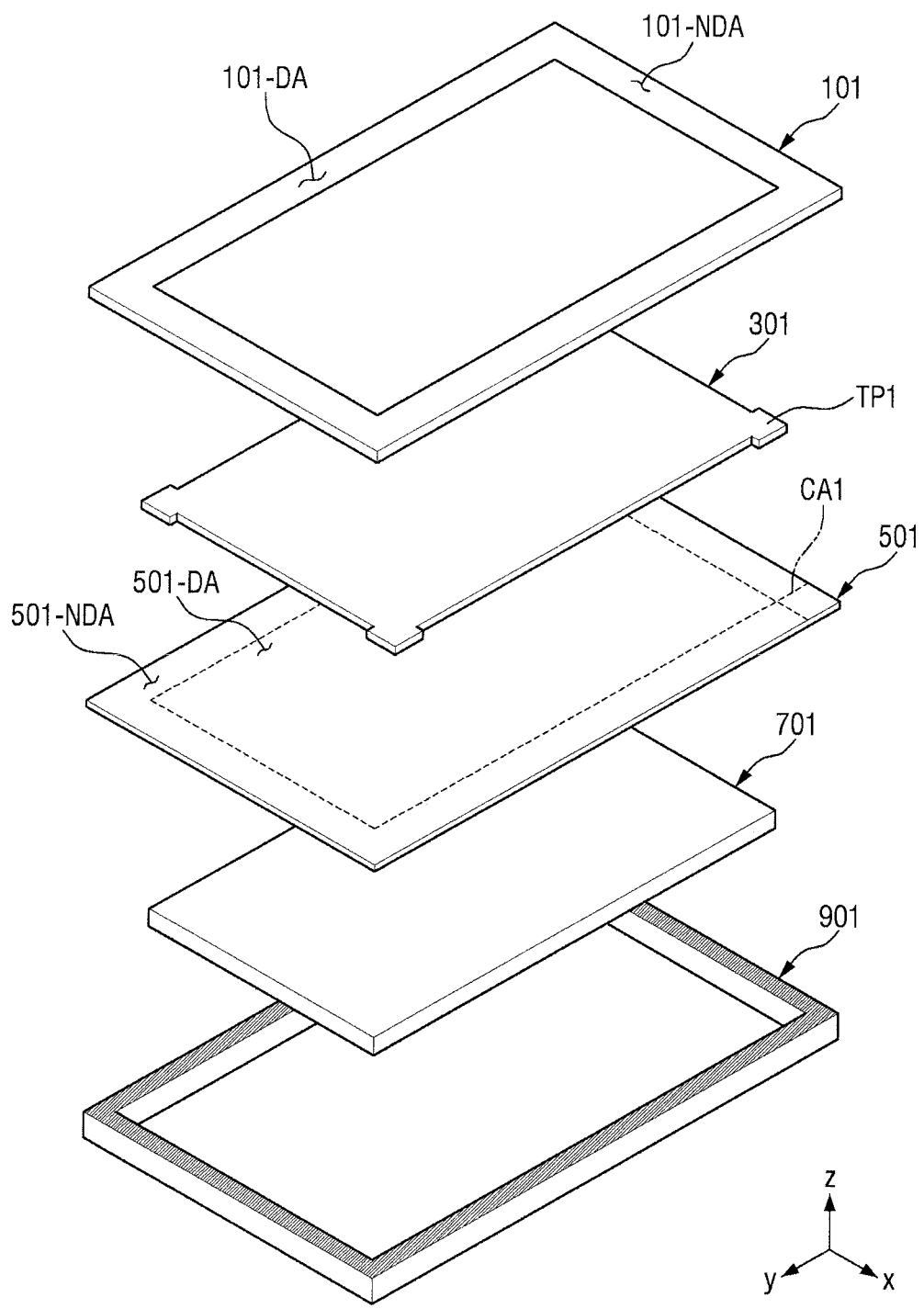
FIG. 32 is an exploded perspective view of the display device of FIG. 31.
Figure 33:
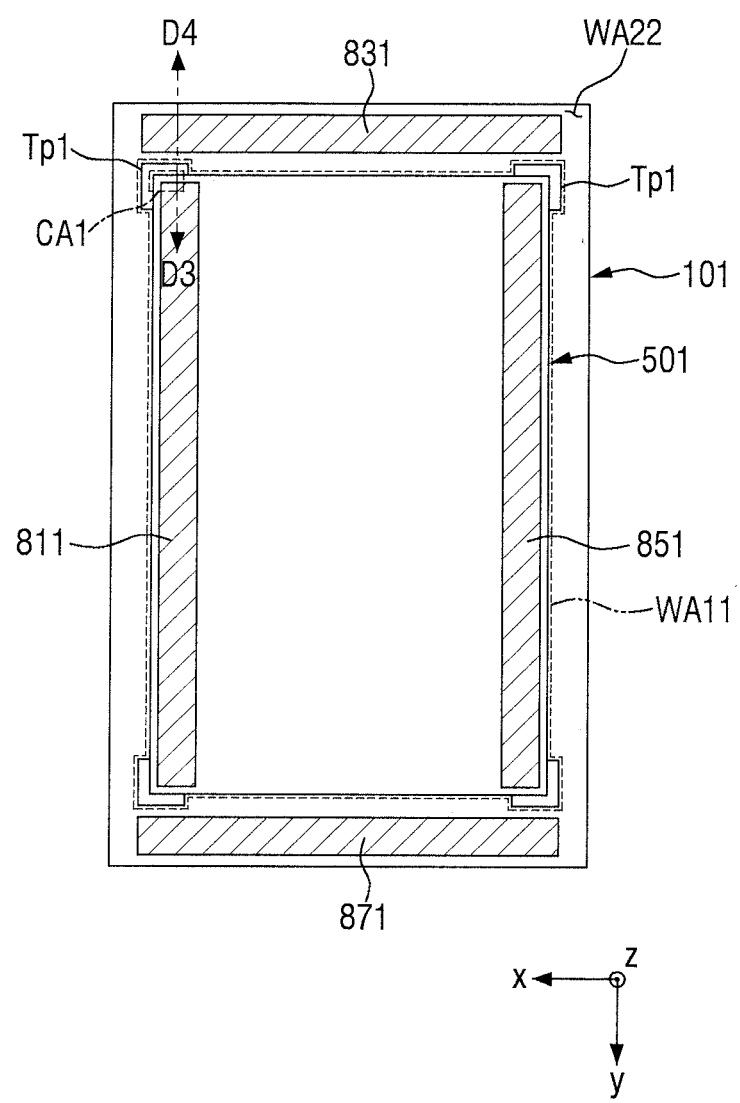
FIG. 33 is a bottom view illustrating a window, an input-sensing member, and a display panel of FIG. 31 in a state of being coupled together.
Figure 34:
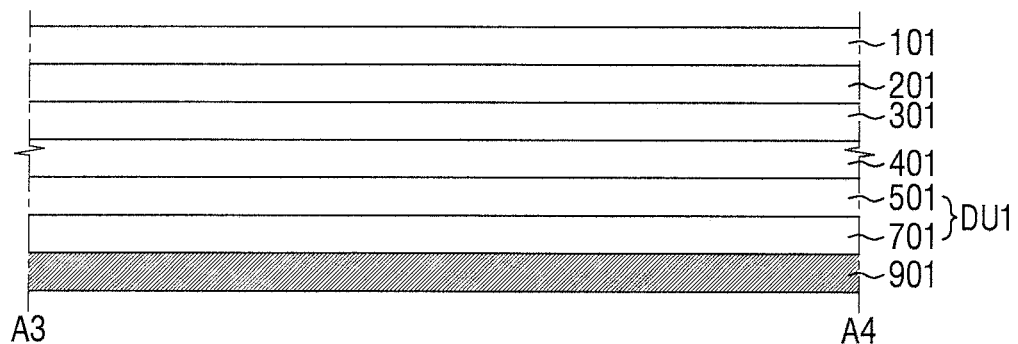
FIG. 34 is a cross-sectional view taken along the line A3-A4 of FIG. 31.
Figure 35:
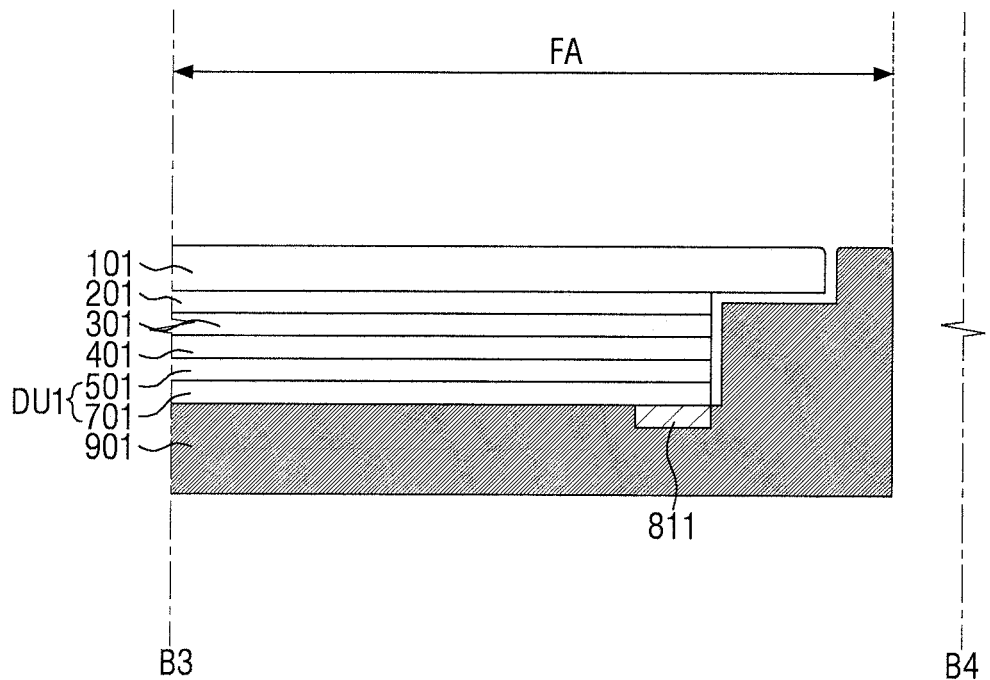
FIG. 35 is a cross-sectional view taken along the line B3-B4 of FIG. 31.
Figure 36:
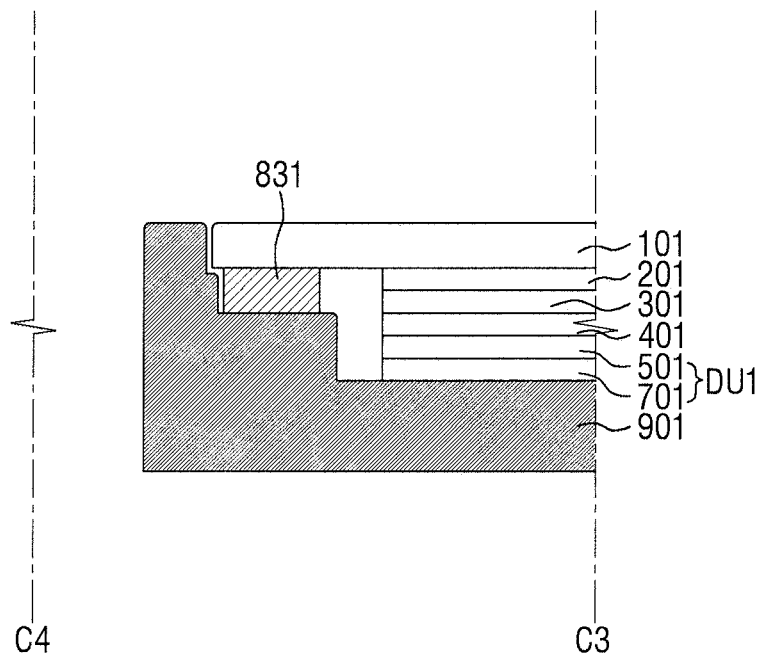
FIG. 36 is a cross-sectional view taken along the line C3-C4 of FIG. 31.
Figure 37:
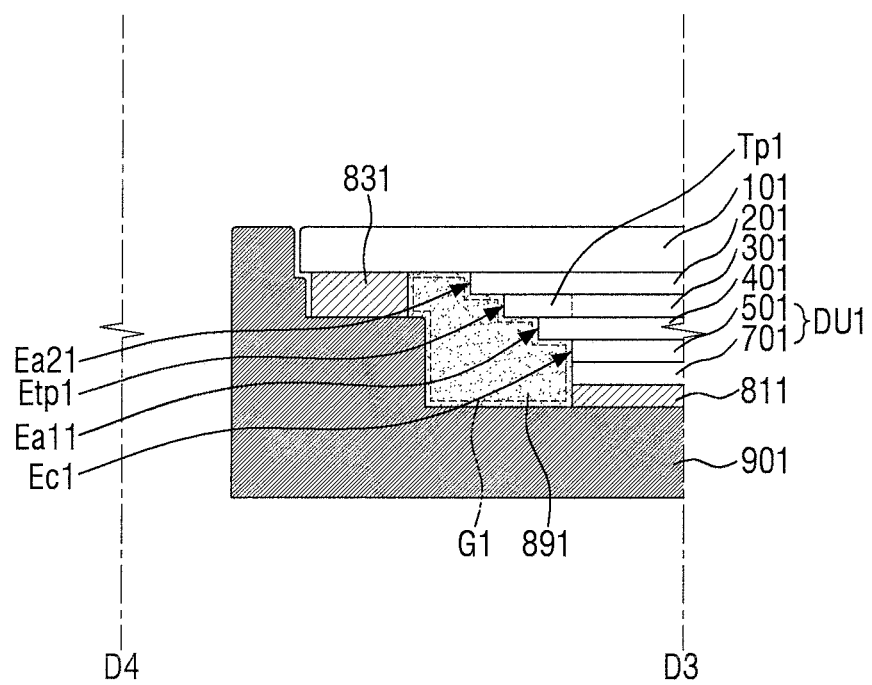
FIG. 37 is a cross-sectional view taken along the line D3-D4 of FIG. 31.

FIG. 31 is a perspective view of a display device according to another embodiment of the present disclosure, FIG. 32 is an exploded perspective view of the display device of FIG. 31, FIG. 33 is a bottom view illustrating a window, an input-sensing member, and a display panel of FIG. 31 in a state of being coupled together, FIG. 34 is a cross-sectional view taken along the line A3-A4 of FIG. 31, FIG. 35 is a cross-sectional view taken along the line B3-B4 of FIG. 31, FIG. 36 is a cross-sectional view taken along the line C3-C4 of FIG. 31, and FIG. 37 is a cross-sectional view taken along the line D3-D4 of FIG. 31.

Referring to FIGS. 31 through 37, a display device 2000 includes a display area DA1 in which an image is displayed and a non-display area NDA1 which adjoins the display area DA1. The non-display area NDA1 may surround the display area DA1.

The display device 2000 is substantially the same as the display device 1000 of FIGS. 1 and 2, except that it only includes a flat area FA and does not include any bent areas. Thus, the display device 2000 will hereinafter be described, focusing mainly on differences from the display device 1000.

Part of the flat area FA may be defined as a display area DA1.

The display device 2000 includes a window 101, an input-sensing member 301, which includes extensions TP1, a display module DU1, which includes a display panel 501 and a panel lower member 701, a bracket 901, a first bonding layer 401, and a second bonding layer 201.

The window 101 includes a light-transmitting portion 101-DA, which transmits an image provided by the display panel 501 therethrough, and a light-blocking portion 101-NDA, which adjoins the light-transmitting portion 101-DA.

The input-sensing member 301 may be between the window 101 and the display module DU1, and may be coupled to the window 101 via the second bonding layer 201. Other features of the input-sensing member 301 may be as described above with reference to FIGS. 7 through 10.

The input-sensing member 301 includes the extensions Tp1, which extend outwardly from the corners of the input-sensing member 301.

The display module DU1 is below the input-sensing member 301. The display module DU1 may include the display panel 501, which is below the input-sensing member 301, and the panel lower member 701, which is below the display panel 501, and may be coupled to the input-sensing member 301 via the first bonding layer 401.

The display panel 501 includes a display area 501-DA and a non-display area 501-NDA. The display area 501-DA, which is an area in which an image is displayed, overlaps with the light-transmitting portion 101-DA of the window 101. The non-display area 501-NDA overlaps with the light-blocking portion 101-NDA of the window 101. Other features of the display panel 501 may be as described above with reference to FIG. 6.

The panel lower member 701 may be below the display panel 501 and may be attached to the bottom surface of the display panel 501. The panel lower member 701 may be as described above with reference to FIGS. 4 and 5.

The bracket 901 may be below the panel lower member 701.

On the bottom surface of the display panel 501, a first waterproof member 811 may be located along the left edge of the display panel 501, and a third waterproof member 851 may be located along the right edge of the display panel 501. The first and third waterproof members 811 and 851 may be attached to the bottom surface of the panel lower member 701.

When the window 101 is divided into a first area Wall, which overlaps with the display panel 501, and a second area Wa22, which does not overlap with the display panel 501, a second waterproof member 831, which is adjacent to the top edge of the display panel 501 and is spaced apart from the display panel 501, and a fourth waterproof member 871, which is adjacent to the bottom edge of the display panel 501 and is spaced apart from the display panel 501, may be in the second area Wa22 on the bottom surface of the window 101, and the second and fourth waterproof members 831 and 871 may be attached to the bottom surface of the window 101.

The first and second waterproof members 811 and 831 may be spaced apart from each other in a second direction y by a gap G1 in an area near a corner portion CA1 of the display panel 501, and an edge Etp1 of an extension Tp1 of the input-sensing member 301 may be between the first and second waterproof members 811 and 831.

The gap G1 between the first and second waterproof members 811 and 831 may be filled with a waterproof filling member 891.

The edge Etp1 of the extension Tp1 of the input-sensing member 301 may be positioned outside at least one of an edge Ea11 of the first bonding layer 401 and an edge Ea21 of the second bonding layer 201.

For example, as illustrated in FIG. 37, the edge Etp1 of the extension Tp1 may be positioned outside the edge Ea11 of the first bonding layer 401, the edge Ea21 of the second bonding layer 201 may be positioned outside the edge Etp1 of the extension Tp1, and the edge Ea11 of the first bonding layer 401 may be positioned outside an edge Ec1 of the corner portion CA1 of the display panel 501. However, the present disclosure is not limited to this example. That is, the relationships between the edge Etp1 of the extension Tp1, the edge Ea11 of the first bonding layer 401, the edge Ea21 of the second bonding layer 201, and the edge Ec1 of the corner portion CA1 of the display panel 501 may vary, as described above with reference to FIGS. 25 through 30.

What is claimed is:

1. A display device having a first area, and a second area that extends from the first area in a first direction and has a bent shape that is bent from the first area in the first direction, the display device comprising:
   a display module comprising a display panel, which has a corner portion in the second area;
   an input-sensing member on the display panel and comprising:
      a body portion, which overlaps with the display panel; and
      an extension, which extends from the body portion in the second area further than the corner portion of the display module extends in the second area in a second direction that is substantially perpendicular to the first direction, such that edges of the extension do not overlap with the display panel in the second direction; and
   a first bonding layer between the display module and the input-sensing member,
   wherein an edge of the extension extends beyond an edge of the corner portion.

2. The display device of claim 1, wherein a bottom surface of the extension is separated from the display panel.

3. The display device of claim 1, wherein the edge of the corner portion is partially surrounded by the edge of the extension.

4. The display device of claim 1, wherein the edge of the corner portion is rounded.

5. The display device of claim 1, further comprising:
   a window on the input-sensing member,
   wherein a distance between an edge of the window and the edge of the extension, measured in the second area along the second direction, is smaller than a distance between the edge of the window and an edge of the body portion, measured in the second area along the second direction.

6. The display device of claim 1, wherein the first bonding layer has an edge that is in the second area, overlaps with the extension, does not overlap the display panel, and is between the edge of the extension and the edge of the corner portion.

7. The display device of claim 1, wherein, in the second area, an edge of the first bonding layer is aligned with the edge of the corner portion.

8. The display device of claim 1, wherein the first bonding layer comprises an optical clear adhesive (OCA), a pressure sensitive adhesive (PSA), or an optical clear resin (OCR) layer.

9. The display device of claim 1, wherein the display panel comprises a base substrate, a light-emitting element on the base substrate, and an encapsulation layer on the light-emitting element, and
   wherein the first bonding layer is on the encapsulation layer.

10. The display device of claim 9, further comprising a window on the input-sensing member,
    wherein the input-sensing member comprises an input-sensing layer on the first bonding layer, and a polarizing layer between the input-sensing layer and the window, and
    wherein the input-sensing layer comprises a base portion on the first bonding layer, and sensing electrodes on a surface of the base portion.

11. The display device of claim 10, wherein the sensing electrodes comprise:
    a plurality of first sensing electrodes, which comprise a plurality of first sensing portions and a plurality of first connecting portions electrically connected to the first sensing portions; and
    a plurality of second sensing electrodes, which comprise a plurality of second sensing portions and a plurality of second connecting portions electrically connected to the second sensing portions,
    wherein the first sensing portions and the second sensing portions are on the same layer, and
    wherein the first connecting portions and the second connecting portions are on different layers.

12. The display device of claim 10, wherein the base portion comprises a phase retarder.

13. The display device of claim 10, wherein the input-sensing layer further comprises a polymer organic layer between the base portion and the sensing electrodes.

14. The display device of claim 9, further comprising a window on the input-sensing member,
    wherein the input-sensing member comprises a polarizing layer on the first bonding layer, and an input-sensing layer on the polarizing layer,
    wherein the window is on the input-sensing layer, and
    wherein the input-sensing layer comprises a base portion on the first bonding layer, and sensing electrodes on a surface of the base portion.

15. The display device of claim 9, further comprising a window on the input-sensing member,
    wherein the input-sensing member comprises a polarizing layer on the first bonding layer, and an input-sensing layer on the polarizing layer,
    wherein the window is on the input-sensing layer, and
    wherein the input-sensing layer comprises a base portion below a second bonding layer, and sensing electrodes on a surface of the base portion.

16. The display device of claim 1, further comprising:
    a window on the input-sensing member; and
    a second bonding layer between the window and the input-sensing member for coupling the window to the input-sensing member,
    wherein the second bonding layer comprises an OCA, PSA, or OCR layer.

17. A display device having a first area, and a second area that extends from the first area and has a bent shape, the display device comprising:
    a display module comprising a display panel, which has a corner portion in the second area;
    an input-sensing member on the display panel and comprising a body portion, which overlaps with the display panel, and an extension, which extends from the body portion, is in the second area, and does not overlap with the display panel;
    a first bonding layer between the display module and the input-sensing member;
    a window on the input-sensing member;
    a first waterproof member coupled to a bottom surface of the display module, and located in the second area along an edge of the display module;
    a second waterproof member coupled to a bottom surface of the window, and spaced apart from the first waterproof member; and a waterproof filling member filling a gap between the first and second waterproof members in an area near the corner portion,
wherein an edge of the extension extends beyond an edge of the corner portion.

18. The display device of claim 17, wherein the waterproof filling member contacts the window, the extension, the first waterproof member, and the second waterproof member.

19. The display device of claim 18, further comprising a bracket below the display module, coupled to the first and second waterproof members, and contacting the waterproof filling member.

20. The display device of claim 17, wherein the display module further comprises a panel lower member below the display panel, and
wherein the first waterproof member is coupled to a bottom surface of the panel lower member.

21. The display device of claim 20, wherein the panel lower member comprises a buffer member below the display panel, and a heat dissipating member below the buffer member.

22. The display device of claim 21, wherein the buffer member comprises a light-blocking layer, and
wherein the panel lower member further comprises a digitizer between the buffer member and the heat dissipating member.

23. A display device comprising:
a display module comprising a display panel having a corner portion;
an input-sensing member on the display panel and comprising a body portion, which overlaps with the display panel, and an extension, which extends from the body portion in an area near the corner portion and does not overlap the display panel;
a first bonding layer between the input-sensing member and the display panel for coupling the input-sensing member and the display panel;
a window on the input-sensing member and having a first area, which overlaps with the display panel, and a second area, which is an area other than the first area;
a second bonding layer between the window and the input-sensing member for coupling the window and the input-sensing member;
a first waterproof member coupled to a bottom surface of the display module, and located along an edge of the display module;
a second waterproof member coupled to a bottom surface of the window, located in the second area, and spaced apart from the first waterproof member; and
a waterproof filling member sealing a space between the first and second waterproof members in the area near the corner portion,
wherein in the area near the corner portion, an edge of the extension extends beyond an edge of the first bonding layer or an edge of the second bonding layer.

24. The display device of claim 23, wherein, in the area near the corner portion, the edge of the extension extends beyond the edge of the first bonding layer, and the edge of the second bonding layer extends beyond the edge of the extension.

25. The display device of claim 23, wherein, in the area near the corner portion, the edge of the extension extends beyond the edge of the first bonding layer and is aligned with the edge of the second bonding layer.

26. The display device of claim 23, wherein, in the area near the corner portion, the edge of the extension extends beyond the edge of the second bonding layer, and
wherein the edge of the first bonding layer extends beyond the edge of the extension.

27. The display device of claim 23, wherein, in the area near the corner portion, the edge of the extension extends beyond the edge of the second bonding layer, and is aligned with the edge of the first bonding layer.

28. The display device of claim 23, wherein, in the area near the corner portion, the edge of the extension extends beyond the edge of the first bonding layer and the edge of the second bonding layer.

29. The display device of claim 23, wherein the waterproof filling member contacts with the window, the extension, the first waterproof member, and the second waterproof member.

30. The display device of claim 29, further comprising a bracket below the display module, coupled to the first and second waterproof members, and contacting the waterproof filling member.

31. The display device of claim 29, wherein the display module further comprises a panel lower member below the display panel, and
wherein the first waterproof member is coupled to a bottom surface of the panel lower member.

* * * * *